(12) United States Patent
Shi

(10) Patent No.: US 11,873,170 B2
(45) Date of Patent: Jan. 16, 2024

(54) BATTERY TRANSMISSION SYSTEM, CONTROL METHOD, SIMULATION METHOD AND APPARATUS, PLC, AND MEDIUM

(71) Applicant: CONTEMPORARY AMPEREX TECHNOLOGY CO., LIMITED, Fujian (CN)

(72) Inventor: Deqiang Shi, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/139,373

(22) Filed: Apr. 26, 2023

(65) Prior Publication Data
US 2023/0331495 A1 Oct. 19, 2023

Related U.S. Application Data

(63) Continuation of application No. PCT/CN2022/087399, filed on Apr. 18, 2022.

(51) Int. Cl.
*B65G 43/08* (2006.01)
*H01M 10/04* (2006.01)
(Continued)

(52) U.S. Cl.
CPC ............ *B65G 43/08* (2013.01); *B65G 47/26* (2013.01); *B65G 47/53* (2013.01); *B65G 61/00* (2013.01);
(Continued)

(58) Field of Classification Search
CPC ........ B65G 43/08; B65G 47/26; B65G 47/53; B65G 61/00; B65G 2201/0267;
(Continued)

(56) References Cited

U.S. PATENT DOCUMENTS 9,908,696 B1 * 3/2018 Zevenbergen ....... G06Q 10/087
10,970,364 B2 * 4/2021 Stolpman ............. G06Q 10/083
(Continued)

FOREIGN PATENT DOCUMENTS

CN 103979284 A 8/2014
CN 110887437 A 3/2020
(Continued)

OTHER PUBLICATIONS

International Search Report dated Jan. 5, 2023, received for PCT Application PCT/CN2022/087399, filed on Apr. 18, 2022, 6 pages including English Translation.

*Primary Examiner* — Gene O Crawford
*Assistant Examiner* — Lester Rushin, III
(74) *Attorney, Agent, or Firm* — XSENSUS LLP

(57) ABSTRACT

A battery transmission system may comprise: a material incoming structure to receive batteries; a first transfer structure to transfer the batteries to a first pallet so as to convey the batteries on a first transmission line, wherein the first transmission line has an unloading position for which at least one second transmission line is provided correspondingly; and a second transfer structure to transfer batteries at the unloading position to a first starting position of the second transmission line so as to transmits, when the number of batteries at the first starting position reaches N, the N batteries to a first termination position of the second transmission line, wherein N≥1.

30 Claims, 5 Drawing Sheets

(51) Int. Cl.
*B65G 47/53* (2006.01)
*B65G 47/26* (2006.01)
*B65G 61/00* (2006.01)

(52) U.S. Cl.
CPC . *H01M 10/0404* (2013.01); *B65G 2201/0267* (2013.01); *B65G 2203/0208* (2013.01); *B65G 2811/0678* (2013.01)

(58) Field of Classification Search
CPC ... B65G 2203/0208; B65G 2811/0678; H01M 10/0404
USPC .......... 700/217; 198/358, 346.2, 463.1, 509, 198/609, 617, 340
See application file for complete search history.

(56) References Cited

U.S. PATENT DOCUMENTS 11,208,275 B2 * 12/2021 Chirol .................. B65G 57/02
11,267,363 B2 * 3/2022 Ing ...................... H01M 50/249

FOREIGN PATENT DOCUMENTS

| CN | 111266317 A | 6/2020 |
| CN | 211895080 U | 11/2020 |

* cited by examiner

BATTERY TRANSMISSION SYSTEM, CONTROL METHOD, SIMULATION METHOD AND APPARATUS, PLC, AND MEDIUM

CROSS-REFERENCE TO RELATED APPLICATION

The present application is a continuation of International Application No. PCT/CN20221087399, filed Apr. 18, 2022, which is incorporated herein by reference in its entirety.

TECHNICAL FIELD

The present application relates to the field of batteries, and in particular to a battery transmission system, a control method, a simulation method and apparatus, a PLC, and a medium.

BACKGROUND ART

At present, electric vehicles mainly use lithium batteries as power because of their characteristics of high capacity, high output voltage, and good charge-discharge cycle performance. In the process of lithium battery transmission and shipment, manual intervention is usually required for the relevant operations, resulting in high labor costs, slow manual operations, and low efficiency.

SUMMARY OF THE DISCLOSURE

In view of the above problems, the present application provides a battery transmission system, a control method, a simulation method and apparatus, a PLC, and a medium, which make it possible to reduce the cost required in the process of battery transmission and shipment and improve the efficiency of transmission.

In a first aspect, embodiments of the present application provides a battery transmission system, comprising: a material incoming mechanism or structure for receiving batteries; a first transfer apparatus or structure for transferring the batteries to a first pallet; the first pallet for conveying the batteries on a first transmission line, wherein the first transmission line has an unloading position for which at least one second transmission line is provided correspondingly; a second transfer apparatus or structure for transferring batteries at the unloading position to a first starting position of the second transmission line; and the second transmission line for transmitting, when the number of batteries at the first starting position reaches N, the N batteries to a first termination position of the second transmission line, wherein $N \geq 1$.

In the technical solution of embodiments of the present application, by providing at least one second transmission line at the unloading position of the first transmission line, it is possible to quickly transfer batteries transmitted to the unloading position of the first transmission line to the first termination position. Moreover, only when the number of batteries at the first starting position reaches N, the second transmission line transmits the N batteries to the first termination position of the second transmission line, thus avoiding frequent round trips of the second transmission line between the first starting position and the first termination position. In addition, the batteries substantially do not require manual intervention during the transmission process, which is conducive to the automatic transmission of the whole process, thus making it possible to reduce the cost required in the battery transmission and shipment process and improve the efficiency of transmission.

In some embodiments, the battery transmission system further comprises: a first identification apparatus or identifier, wherein the first identification apparatus is used for identifying the types of M batteries received by the material incoming mechanism, wherein $M > 1$; and the first transfer apparatus is used for transferring the M batteries to M first pallets on the first transmission line according to the types of the M batteries.

The technical solution of embodiments of the present application facilitates targeted transfer depending on different types of batteries, so as to meet the actual production needs.

In some embodiments, in the case where the M batteries are all of the same type or all of different types, the first transfer apparatus is used for transferring the M batteries to the M first pallets on the first transmission line; and in the case where the M batteries comprise batteries of different types and there are batteries of the same types, the first transfer apparatus is used for separately grasping the batteries of the same types sequentially to the M first pallets on the first transmission line, wherein batteries transferred by the first transfer apparatus each time are of the same type and two adjacent transfers are separated by a preset time interval.

The technical solution of embodiments of the present application is beneficial to enable batteries of the same type to be unloaded at the same time when they reach the unloading position, that is, to be transferred to the first starting position of the second transmission line at the same time, thereby avoiding the situation where batteries are easily disordered when being unloaded from the first transmission line. Meanwhile, it is also beneficial to make the number of batteries on the second transmission line at the first starting position reach N quickly, thus speeding up the battery transmission.

In some embodiments, the first transfer apparatus is used for grasping, according to the numbers of the batteries of the same types among the M batteries, the batteries of the same types sequentially to the M first pallets on the first transmission line.

In the technical solution of embodiments of the present application, it is beneficial to avoid, to a certain extent, a state of congestion between a plurality of first pallets that may occur on the first transmission line.

In some embodiments, the first transfer apparatus is used for grasping, according to the order of the numbers of the batteries of the same types among the M batteries from large to small, the batteries of the same types sequentially to the M first pallets on the first transmission line.

The technical solution of embodiments of the present application enables the first transmission line to transmit batteries in an orderly manner. Moreover, after batteries of the same types in high quantities are transferred, the first pallets carrying these batteries become empty pallets and can go to carry new batteries again so as to achieve cyclic transmission of batteries and speed up the transmission of batteries.

In some embodiments, the first transmission line has a plurality of unloading positions for which a plurality of second transmission lines are provided correspondingly, each of the second transmission lines corresponding to a battery type; and the battery transmission system further comprises: a second identification apparatus or identifier, wherein the second identification apparatus is used for identifying the type of a battery transmitted to the unloading position; and the second transfer apparatus is used for transferring the battery transmitted to the unloading position to a first starting position of a second transmission line corresponding to the type of the battery.

In the technical solution of embodiments of the present application, by identifying the types of batteries transmitted to the unloading position by the second identification apparatus, batteries of different types enter second transmission lines corresponding to different types, which facilitates targeted transmission of batteries of different types.

In some embodiments, the second transfer apparatus is used for transferring, according to the number a of batteries of a target type that are transmitted to the unloading position and the number b of batteries of the target type that are already present at the first starting position, c batteries transmitted to the unloading position to a first starting position of a second transmission line corresponding to the target type, wherein a≥c, and when a≥N−b, b+c=N.

The technical solution of embodiments of the present application avoids the need for the second transfer apparatus to perform multiple transfers to bring the number of batteries on the first starting position to N, which can improve the transmission efficiency of batteries.

In some embodiments, each of the first pallets is independently controlled by a controller, the controller being used for controlling a first pallet in which the batteries transmitted to the unloading position are located to stop movement when the second transfer apparatus transfers the batteries transmitted to the unloading position, and controlling the first pallet to start movement after determining that the batteries in the first pallet are transferred.

The technical solution of embodiments of the present application is beneficial to avoid the collision of batteries when they are transferred, thus contributing to the safety of battery transmission.

In some embodiments, the first transmission line has a loading position, the controller being further used for controlling the first pallet to stop movement when the first pallet is moved on the first transmission line to the loading position, and controlling the first pallet to start movement after the first transfer apparatus transfers batteries to the first pallet.

In the technical solution of embodiments of the present application, this first pallet is in a relatively stationary and stable state when the first pallet stops movement, and in this case, when batteries are transferred by the first transfer apparatus, it is beneficial to avoid collision of the batteries when they are transferred, thus contributing to the safety of battery transmission.

In some embodiments, the number of the first pallets on the first transmission line is multiple, each of the first pallets being used for conveying one battery, and adjacent ones of the first pallets being spaced at a preset safe distance during movement on the first transmission line.

In the technical solution of embodiments of the present application, adjacent first pallets are spaced at a preset safe distance during movement on the first transmission line, thus facilitating avoiding collisions between the first pallets which result in collisions of batteries in the first pallets, that is, improving the safety of simultaneous movement of several first pallets on the first transmission line.

In some embodiments, the second transmission line comprises m connected belts, each belt moving independently under the drive by a motor, the first starting position being the position of the 1st belt and the first termination position being the position of the mth belt, m>1, wherein when N batteries are transmitted to the mth belt, a motor for the mth belt is used for controlling the mth belt to stop movement; when N batteries are transmitted to the mth belt and there are N batteries present on each of k1 consecutive belts located after the mth belt, motors for controlling the k1 consecutive belts after the mth belt are used for controlling the k1 consecutive belts to stop movement, respectively, k1≥1; when N batteries are transmitted to the ith belt and there are no batteries on the (i+1)th belt, a motor for the ith belt is used for controlling the ith belt to move, i≥1; and when N batteries are transmitted to the ith belt and there are N batteries present on each of k2 consecutive belts located before the ith belt and none of the k2 consecutive belts is the mth belt, the motor for the ith belt is used for controlling the ith belt to move and motors for the k2 consecutive belts are used for controlling the k2 consecutive belts to move, respectively, k2≥1.

In the technical solution of embodiments of the present application, the second transmission line comprises m connected belts, each belt being independently controlled by a motor, thereby avoiding collisions of batteries on the second transmission line during transmission and improving the safety of battery transmission.

In some embodiments, the battery transmission system further comprises: an assembly apparatus or structure for assembly based on batteries that are at the first termination position to obtain a battery pack.

In the technical solution of embodiments of the present application, in combination with the assembly apparatus, it is conducive to realizing automatic assembly of battery packs, which avoids the need for manual intervention for the assembly of battery packs, thus facilitating the improvement of the assembly efficiency of battery packs.

In some embodiments, the battery transmission system further comprises: a third transmission line corresponding to the second transmission line, the assembly apparatus is used for transferring the batteries at the first termination position to a middle cover of the third transmission line and, after a layer of batteries is arranged all over the middle cover, transferring a new middle cover onto the layer of batteries; and if the number of battery layers does not reach a preset number of layers, the assembly apparatus is used for continuing to transfer batteries to the new middle cover until the number of battery layers reaches the preset number of layers to obtain an assembled battery pack.

The technical solution of embodiments of the present application facilitates automatic assembly to obtain battery packs with different numbers of battery layers, thus realizing automatic assembly of battery packs of different specifications and improving the efficiency of battery assembly.

In some embodiments, the battery transmission system further comprises: a sliding module or structure for transferring the batteries at the first termination position to a second starting position of a fourth transmission line to form a row of batteries at the second starting position, the row of batteries comprising a plurality of batteries of the same type; the fourth transmission line for transmitting the row of batteries to a second termination position of the fourth transmission line after the row of batteries is formed at the second starting position; and the assembly apparatus for transferring the row of batteries at the second termination position to a middle cover of a third transmission line corresponding to the type of the row of batteries.

The technical solution of embodiments of the present application facilitates the reduction of the number of round trips of grasping and placing by the assembly apparatus, thus improving the takt of the production line to increase the yield of battery packs.

In some embodiments, if the number of battery layers does not reach the preset number of layers, the assembly apparatus is further used for continuing transferring the row of batteries at the second termination position and placing same on the new middle cover until the number of battery layers reaches the preset number of layers to obtain the assembled battery pack, the layer of batteries comprising a number of rows of batteries of the same type.

The technical solution of embodiments of the present application facilitates the automatic assembly to obtain a battery pack that can reach a preset number of layers.

In some embodiments, the sliding module comprises: a sliding track and a sliding pallet slidable on the sliding track, the sliding pallet being used for receiving the N batteries transmitted on the second transmission line and carrying the N batteries to slide along the sliding track to a row-forming position; and the sliding track being used for sliding in the direction of the fourth transmission line when the sliding pallet slides to the row-forming position, so that the N batteries on the sliding pallet slide to the second starting position, wherein when there are batteries present at the second starting position, the N batteries received by the sliding pallet are of the same type as the batteries present at the second starting position, and the N batteries on the sliding pallet, after sliding to the second starting position, belong to the same row of batteries as the batteries present at the second starting position.

In the technical solution of embodiments of the present application, the cooperation of the sliding track and the sliding pallet facilitates the smooth conveying of the N batteries transmitted on the second transmission line to the second starting position of the fourth transmission line in order to form a row of batteries of the same type at the second starting position. The sliding pallet can slide on the sliding track so that the sliding pallet can accept batteries transmitted by more than one second transmission line, facilitating the transfer of batteries transmitted by second transmission lines corresponding to different types to the fourth transmission line, so as to wait for the assembly apparatus to perform further transfer of a row of batteries at the second termination position of the fourth transmission line.

In some embodiments, the type comprises a qualified type and an unqualified type, and the second transmission line comprises a qualified-type transmission line and an unqualified-type transmission line, the sliding module being used for transferring the N batteries transmitted to a first termination position of the qualified-type transmission line to the second starting position; and the unqualified-type transmission line being used for transmitting batteries transmitted to a first initial position of the unqualified-type transmission line to a first termination position of the unqualified-type transmission line.

In the technical solution of embodiments of the present application, by providing qualified-type transmission lines and unqualified-type transmission lines, it is convenient for the assembly apparatus to assemble qualified batteries coming from the qualified-type transmission lines, and by transmitting unqualified-type batteries through the unqualified-type transmission lines, it is beneficial to automatically screen out unqualified batteries through specific transmission lines to ensure the product quality of battery packs finally obtained through assembly.

In some embodiments, the battery transmission system further comprises: a spacing-changing mechanism or structure, the spacing-changing mechanism being used for adjusting the spacing between batteries in the row of batteries formed at the second starting position so that the row of batteries for which the spacing has been adjusted conforms to an assembly range of the assembly apparatus.

In the technical solution of embodiments of the present application, the spacing-changing mechanism is provided to facilitate smooth transfer, by the assembly apparatus, the row of batteries on the second starting position within its own assembly range.

In some embodiments, the battery transmission system further comprises: a lifting apparatus or structure on which a second pallet is placed, the second pallet being used for placing a stack of middle covers, the lifting apparatus being used for lifting the second pallet to a preset height after each transfer of a new middle cover by the assembly apparatus.

The technical solution of embodiments of the present application enables the assembly apparatus to transfer the middle covers based on the same height each time, thus allowing to save production takts.

In some embodiments, the lifting apparatus is further used for lowering the second pallet to an initial height after the stack of middle covers placed on the second pallet have all been transferred by the assembly apparatus.

The technical solution of embodiments of the present application facilitates the subsequent repositioning of a stack of middle covers on the second pallet.

In some embodiments, the battery transmission system further comprises: a fifth transmission line, the fifth transmission line being used for re-transmitting a stack of middle covers to the second pallet after the second pallet has been lowered to the initial height.

The technical solution of embodiments of the present application enables the automation process of battery assembly to be carried out continuously and automatically.

In some embodiments, the battery transmission system further comprises: a sixth transmission line, the sixth transmission line being used for transmitting the battery pack to a target area to enable an AGV in the target area to transport the battery pack to a warehouse.

The technical solution of embodiments of the present application facilitates the transportation of palletized battery cells to the warehouse by the AGV in the target area to meet the storage needs of the assembled battery packs, further improving the whole process of automatic production of battery packs.

In a second aspect, embodiments of the present application provide a control method for controlling the battery transmission system as described in the first aspect, wherein the control method applies to a PLC, comprising: controlling a material incoming mechanism to receive batteries; controlling a first transfer apparatus to transfer the batteries to a first pallet; controlling the first pallet to convey the batteries on a first transmission line, wherein the first transmission line has an unloading position for which at least one second transmission line is provided correspondingly; controlling a second transfer apparatus to transfer batteries at the unloading position to a first starting position of the second transmission line; and controlling the second transmission line to transmit, when the number of batteries at the first starting position reaches N, the N batteries to a first termination position of the second transmission line, wherein N≥1.

In a third aspect, embodiments of the present application provide a control apparatus for controlling the battery transmission system as described in the first aspect, comprising: a first control module for controlling a material incoming mechanism to receive batteries; a second control module for controlling a first transfer apparatus to transfer the batteries to a first pallet; a third control module for controlling the first pallet to convey the batteries on a first transmission line, wherein the first transmission line has an unloading position for which at least one second transmission line is provided correspondingly; a fourth control module for controlling a second transfer apparatus to transfer batteries at the unloading position to a first starting position of the second transmission line; and a fifth control module for controlling the second transmission line to transmit, when the number of batteries at the first starting position reaches N, the N batteries to a first termination position of the second transmission line, wherein N≥1.

In a fourth aspect, embodiments of the present application provide a simulation method for a battery transmission system, wherein the battery transmission system is the battery transmission system as described in the first aspect above, the simulation method comprising: establishing a simulation model for the battery transmission system in simulation software; determining, for battery packs of different specifications, product per minute of battery packs of the simulation model separately under the action of multiple sets of simulation parameters; determining, according to the product per minute of battery packs of the simulation model separately under the action of the multiple sets of simulation parameters, target simulation parameters separately corresponding to the battery packs of different specifications, wherein the product per minute of battery packs under the action of the target simulation parameters is greater than a preset quantity, the target simulation parameters separately corresponding to the battery packs of different specifications being used as assembly parameters of the battery transmission system when assembling the battery packs of different specifications.

In the technical solution of embodiments of the present application, the simulation of the battery cell transmission system facilitates the quick selection of assembly parameters for battery packs of different specifications that can lead to a higher yield of battery packs so as to be applied to the actual production line construction and production, thereby facilitating the automatic transmission and assembly while increasing the unit yield of battery packs of different specifications.

In some embodiments, the simulation parameters comprise: the number of battery rows in a layer of batteries and the number of batteries transferred by an assembly apparatus each time.

In the technical embodiment of embodiments of the present application, the simulation parameters comprise: the number of battery rows in a layer of batteries and the number of batteries transferred by an assembly apparatus each time, which are conducive to obtaining assembly parameters that are desired in actual production.

In a fifth aspect, embodiments of the present application provide a simulation apparatus for a battery transmission system, wherein the battery transmission system is the battery transmission system as described in the first aspect above, the simulation apparatus comprising: an establishment module for establishing a simulation model for the battery transmission system in simulation software; a first determination module for determining, for battery packs of different specifications, product per minute of battery packs of the simulation model separately under the action of multiple sets of simulation parameters; a second determination module for determining, according to the product per minute of battery packs of the simulation model separately under the action of the multiple sets of simulation parameters, target simulation parameters separately corresponding to the battery packs of different specifications, wherein the product per minute of battery packs under the action of the target simulation parameters is greater than a preset quantity, the target simulation parameters separately corresponding to the battery packs of different specifications being used as assembly parameters of the battery transmission system when assembling the battery packs of different specifications.

In a sixth aspect, embodiments of the present application provide a programmable logic controller (PLC), comprising: at least one processor; and a memory communicatively connected to the at least one processor, wherein the memory stores instructions executable by the at least one processor, the instructions being executed by the at least one processor to enable the at least one processor to execute the control method as described in the second aspect.

In a seventh aspect, embodiments of the present application provide an electronic device, comprising: at least one processor; and a memory communicatively connected to the at least one processor, wherein the memory stores instructions executable by the at least one processor, the instructions being executed by the at least one processor to enable the at least one processor to execute the simulation method as described in the fourth aspect.

In an eighth aspect, embodiments of the present application provide a computer-readable storage medium storing a computer program, wherein the computer program, when executed by a processor, implements the control method as described in the second aspect, or implements the simulation method as described in the fourth aspect.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

In order to illustrate the technical solutions of the examples of the present application more clearly, the following briefly introduces the drawings required in the examples of the present application. Obviously, the drawings described below are only some examples of the present application. For those of ordinary skill in the art, other drawings can also be obtained according to the drawings without any creative effort.

Figure 1:
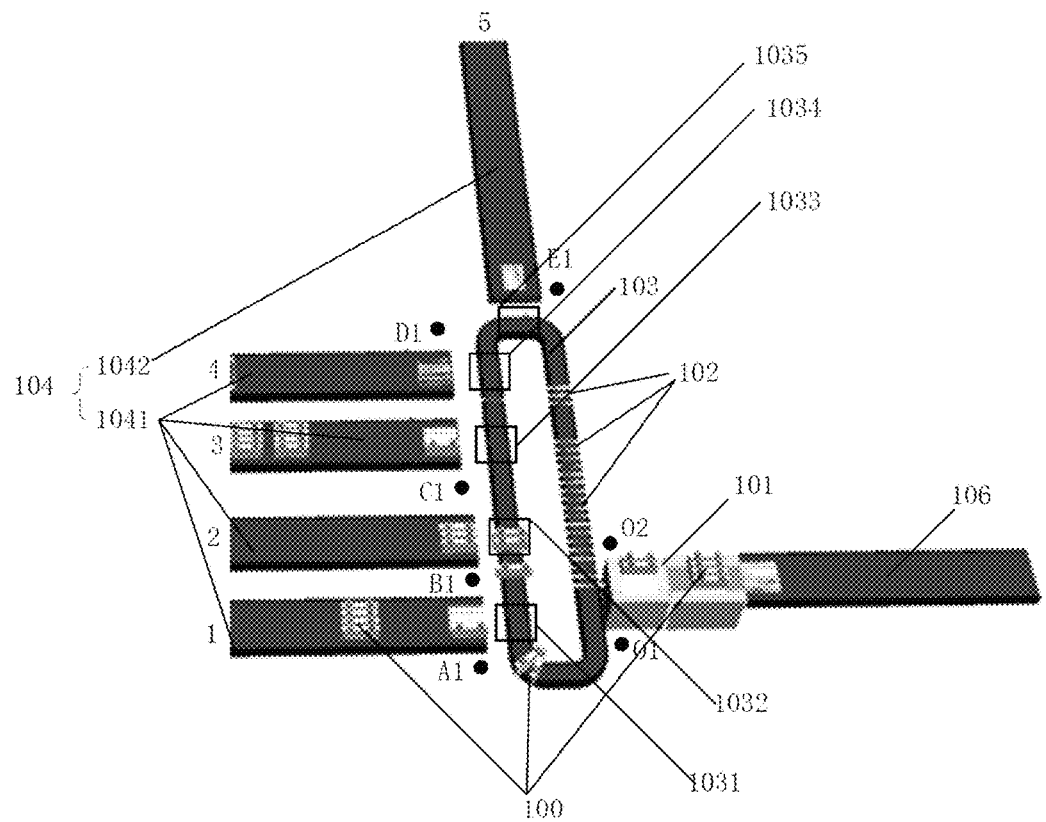
FIG. 1 is a schematic diagram of a battery transmission system as disclosed in some embodiments of the present application.

In the accompanying drawings, the drawings are not drawn to actual scale.

DETAILED DESCRIPTION

Embodiments of the present application will be described in further detail hereinafter in conjunction with the accompanying drawings and embodiments. The following detailed description of the examples and the accompanying drawings are used to illustrate the principles of the present application by way of example, but should not be used to limit the scope of the present application, that is, the present application is not limited to the described examples.

In the description of the present application, it should be noted that unless otherwise specified, "multiple" means more than two; the orientation or location relationships indicated by the terms "up", "down", "left", "right", "inside", "outside", etc., are only for convenience and simplification of the description of the present application, but do not indicate or imply that the devices or elements referred to must have a particular orientation, be constructed and operate in a particular orientation, and therefore cannot be construed as a limitation of the present application. In addition, the terms "first", "second" and "third" are only used for descriptive purposes, and cannot be construed as indicating or implying relative importance. "Vertical" does not mean being vertical in the strict sense, but within the allowable range of error. "Parallel" does not mean being parallel in the strict sense, but within the allowable range of error.

Orientation words appearing in the following description are all directions shown in the drawings, and do not limit the specific structure of the present application. In the description of the present application, it should also be noted that, unless otherwise expressly specified and defined, the terms "install", "connected" and "connect" should be understood in a broad sense, for example, they may be fixedly connected, detachably connected or integrally connected; and they may be directly connected or indirectly connected through an intermediate medium. For those of ordinary skill in the art, the specific meanings of the above terms in the present application may be understood according to specific circumstances.

At present, from the perspective of the development of the market situation, power batteries are more and more widely used. The power batteries are not only applied in energy storage power source systems such as hydraulic, thermal, wind and solar power stations but also wildly applied in electric vehicles such as electric bicycles, electric motor- cycles and electric cars, as well as multiple fields such as military equipment and aerospace fields. With the continuous expansion of the application field of the power batteries, the market demand is also constantly expanding.

The batteries on the market are mostly rechargeable storage batteries, and the most common ones are lithium batteries, such as lithium-ion batteries or lithium-ion polymer batteries, and the like. In the process of transmission and shipment lithium batteries, manual intervention is usually required. For example, 8 to 10 workers may be required to perform a series of operations such as visual inspection of cells, dismounting, placing middle covers, packing, plate covering, handling, etc. Because of the high labor cost due to the large number of workers required, and constant iterative updating of the cell processes, it is necessary to continuously improve the pieces per minute (PPM) of the production line to shorten the delivery cycle of battery cells and increase the yield of the production line.

Due to the different requirements of different manufacturers for specifications of battery cells, there are many kinds of battery cell product specifications at this stage, and for battery cells of different specifications, there are several cases in which 3, 4, 5, or 6 rows exist on each layer of middle cover, and the number of batteries in each row may be 10, 12, 14, 16, or 18. Therefore, the cases of battery cells that may be stored in each layer of middle cover are listed in Table 1 below, and battery cells of the same specification may also be divided into several grades according to their quality.

TABLE 1

| Three rows of battery cells | Four rows of battery cells | Five rows of battery cells | Six rows of battery cells |
|---|---|---|---|
| 10*3 | 10*4 | 10*5 | 10*6 |
| 12*3 | 12*4 | 12*5 | 12*6 |
| 14*3 | 14*4 | 14*5 | 14*6 |
| 16*3 | 16*4 | 16*5 | 16*6 |
| 18*3 | 18*4 | 18*5 | 18*6 |

The inventors note that, for the characteristics of diversified specifications of the current battery cell products, it is already difficult to meet the production demand by manual operations at this stage. Based on this, this embodiment provides a battery transmission system to realize automatic transmission of batteries, reduce the cost of battery transmission, and improve the efficiency of battery transmission.

The battery transmission system disclosed in the embodiment of the present application applies to relevant scenarios where automatic transmission of batteries is required to replace a series of manual operations on the production line, such as manual visual inspection of battery cells, dismounting, placing middle covers, packing, plate covering, handling, etc. Here, the batteries may be finished batteries, or semi-finished batteries that may also be understood as battery cells. Therefore, the battery transmission system in this embodiment may also be a battery cell transmission system.

In some embodiments, it is also possible to identify the types of batteries, to automatically transmit different types of batteries, and then to assemble different types of batteries. For example, the types of batteries may be any one of A, B, C, D, or E. This embodiment can transmit 5 types of batteries separately through different transmission lines and assemble them to obtain battery packs of different types. Batteries included in the battery packs of same type all belong to the same type. It should be noted that the above types of A, B, C, D and E are just an example of dividing batteries into 5 types, while in the specific implementation, there is no limit of dividing into 5 types.

In some embodiments, reference can be made to FIG. 1 for the schematic diagram of the battery transmission system, comprising: a material incoming mechanism 101, a first transfer apparatus, a first pallet 102, a first transmission line 103, second transmission lines 104, and a second transfer apparatus.

The material incoming mechanism 101 is used for receiving batteries 100. The first transfer apparatus is used for transferring the batteries 100 to the first pallet 102. The first pallet 102 is used for conveying the batteries on the first transmission line 103, wherein the first transmission line 103 has an unloading position for which at least one second transmission line 104 is provided correspondingly. The second transfer apparatus is used for transferring batteries 100 at the unloading position to a first starting position of the second transmission line 104. The second transmission line 104 is used for transmitting, when the number of batteries at the first starting position reaches N, the N batteries to a first termination position of the second transmission line 104, wherein N≥1.

The components of the battery transmission system are specifically described below.

The material incoming mechanism 101 is used for receiving batteries 100 transmitted from a previous station. Here, the previous station may be a detection station that is used to detect information such as the length, width, height, internal resistance, and type of a battery, and after the detection is completed, convey the battery to the material incoming mechanism 101 through the logistics conveying line 106. Among them, the type of the battery cell detected by the detection station may be the quality grade, shape, size, etc., of the battery cell.

The first transfer apparatus may be arranged on any side of the material incoming mechanism 101. For example, referring to FIG. 1, the first transfer apparatus may be arranged at the position of point O1 or arranged at the position of point O2.

In some embodiments, the first transfer apparatus may be a first module grasper, and the transfer of batteries by the first transfer apparatus to the first pallet can be understood as follows: the first module grasper grasps batteries transmitted to the material incoming mechanism into the first pallet to achieve the transfer of the batteries into the first pallet.

In some embodiments, the first transfer apparatus may be a first module chunk, and the transfer of batteries by the first transfer apparatus to the first pallet can be understood as follows: the first module chunk sucks batteries transmitted to the material incoming mechanism into the first pallet by attraction force to achieve the transfer of the batteries into the first pallet.

The first pallet 102 is arranged on the first transmission line 103 and can move on the first transmission line 103 to convey batteries. The first pallet 102 may be a pallet for conveying a single battery, that is, each first pallet 102 is used for conveying a single battery, or a single battery cell. Here, the number of first pallets 102 may be multiple, and the plurality of first pallets 102 may move simultaneously on the first transmission line 103 to convey a plurality of batteries simultaneously. The plurality of first pallets 102 may be spaced apart from each other at a preset safe distance during movement to avoid collisions between the plurality of first pallets 102.

The first transmission line 103 may be a ring-shaped transmission line as shown in FIG. 1. The ring-shaped transmission line can save the space required for transmission while transmitting batteries to a specified position, and can also facilitate the recycling of the first pallets 102 on the first transmission line 103 to convey batteries. Optionally, the ring-shaped transmission line may be a ring-shaped magnetic drive line. However, the ring-shaped transmission line in this embodiment is only an example of the first transmission line and the specific implementation is not limited in this regard. For example, the first transmission line may also be a straight transmission line or a ring-shaped line of other shapes.

The first transmission line 103 has an unloading position for which at least one second transmission line 104 is provided correspondingly. For example, one second transmission line 104 may be correspondingly provided for each unloading position to transmit batteries unloaded from that unloading position. That is, if there are a plurality of unloading positions on the first transmission line, there are also a plurality of corresponding second transmission lines 104. Referring to FIG. 1, the number of the second transmission lines 104 may be 5, indicating that the first transmission line 103 has 5 unloading positions, which are 1031, 1032, 1033, 1034, and 1035 in FIG. 1, respectively, and batteries on the first transmission line 103 may be transferred from the unloading positions to the 5 second transmission lines, respectively.

A plurality of different second transmission lines can be used for transmitting different types of batteries, respectively. Here, the different types of batteries may be different shaped batteries, different grades of batteries, or different sizes of batteries. It should be noted that this embodiment only takes as an example the use of the three dimensions of the shape, grade, and size of a battery to measure the type of battery, and the specific implementation is not limited in this regard, but may also use other dimensions to measure the types of batteries.

The second transfer apparatus (not shown in FIG. 1) may be provided near the unloading position or, alternatively, on either side of the first starting position of the second transmission line. Each second transmission line is provided with a second transfer apparatus on either side of the first starting position of the second transmission line. For example, referring to FIG. 1, there are 5 second transmission lines, wherein a second transfer apparatus 1 is provided on one side (point A1) of the first starting position of a second transmission line 1, a second transfer apparatus 2 is provided on one side (point B1) of the first starting position of a second transmission line 2, a second transfer apparatus 3 is provided on one side (point C1) of the first starting position of a second transmission line 3, a second transfer apparatus 4 is provided on one side (point D1) of the first starting position of a second transmission line 4, and a second transfer apparatus 5 is provided on one side (point E1) of the first starting position of a second transmission line 5.

In some embodiments, the second transfer apparatus may be a second module grasper, and the transfer of batteries by the second transfer apparatus to the first starting position of the second transmission line can be understood as follows: the second module grasper grasps batteries transmitted to the unloading position to the first starting position of the second transmission line to achieve the transfer of the batteries to the first starting position of the second transmission line.

In some embodiments, the second transfer apparatus may be a second module chunk, and the transfer of batteries by the second transfer apparatus to the first starting position of the second transmission line can be understood as follows: the second module chunk sucks batteries transmitted to the unloading position to the first starting position of the second transmission line by attraction force to achieve the transfer of the batteries to the first starting position of the second transmission line.

In some embodiments, referring to FIG. 1, the second transfer apparatus 1 is used for transferring, when batteries transmitted to the unloading position 1031 satisfies an unloading condition of the unloading position 1031, the batteries transmitted to the unloading position 1031 to the first starting position of the second transmission line 1. The second transfer apparatus 2 is used for transferring, when batteries transmitted to the unloading position 1032 satisfies an unloading condition of the unloading position 1032, the batteries transmitted to the unloading position 1032 to the first starting position of the second transmission line 2. Similarly, the second transfer apparatuses 3, 4, and 5 are used for transferring batteries transmitted to the unloading positions 1033, 1034, and 1035 to the first starting positions of the second transmission lines 3, 4, and 5, respectively, when the batteries transmitted to the unloading positions 1033, 1034, and 1035 meet corresponding unloading conditions. Here, different unloading positions correspond to different unloading conditions, and different unloading conditions can be set according to actual needs, which is not specifically limited in this embodiment.

In some embodiments, the second transmission line 104 can be a straight transmission line, the first starting position and the first termination position of the second transmission line 104 are respectively the two end positions of the second transmission line 104. The first starting position of the second transmission line 104 may be a position on the second transmission line 104 that is close to the first transmission line 103. The position on the second transmission line 104 that is close to the first transmission line 103 may also be understood to be a position on the second transmission line 104 that is close to the unloading position. The first termination position on the second transmission line 104 may be the position on the second transmission line 104 that is furthest from the first starting position.

The second transmission line 104 may detect the number of batteries at the first starting position. For example, the first starting position is divided into N areas for placing batteries, and each area may be provided with a pressure sensor, wherein when a battery is transferred to an area on the first starting position, the pressure sensor for that area can detect it. When each of the N pressure sensors in a second transmission line detect that a battery is placed into the corresponding area, it means that the number of batteries at the first starting position of that second transmission line reaches N, and then the second transmission line 104 can start transmitting the N batteries to the first termination position of that second transmission line 104.

In some embodiments, the N pressure sensors may interact with a PLC to control the entire battery transmission system via the PLC. Upon receiving target information from all of the N pressure sensors, the PLC sends a control instruction to a motor for the second transmission line 104, so as to enable the motor to move to drive the second transmission line 104 to start movement. Here, the target information characterizes the detection by a pressure sensor that there is a battery placed into the area where it is located.

In some embodiments, N>1, such as N=4, that is, when the number of batteries in the second transmission line 104 at the first starting position reaches 4, the 4 batteries are transmitted as a group of batteries toward the first termination position of the second transmission line 104.

In this embodiment, batteries are automatically received by the material incoming mechanism and subsequently transferred to the first pallet by the first transfer apparatus, thereby enabling the first pallet to convey the batteries on the first transmission line. Next, batteries conveyed to the unloading position of the first transmission line are transferred to the first starting position of the second transmission line by the second transfer apparatus, so that when the number of batteries on the second transmission line at the first starting position reaches N, the N batteries are transmitted to the first termination position of the second transmission line. By providing at least one second transmission line at the unloading position of the first transmission line, it is possible to quickly transfer batteries transmitted to the unloading position of the first transmission line to the first termination position. Moreover, only when the number of batteries at the first starting position reaches N, the second transmission line transmits the N batteries to the first termination position of the second transmission line, thus avoiding frequent round trips of the second transmission line between the first starting position and the first termination position. In addition, the batteries substantially do not require manual intervention during the transmission process, which is conducive to the automatic transmission of the whole process, thus making it possible to reduce the cost required in the battery transmission and shipment process and improve the efficiency of transmission.

According to some embodiments of the present application, optionally, the battery transmission system further comprises: a first identification apparatus, wherein the first identification apparatus is used for identifying the types of M batteries received by the material incoming mechanism, wherein M>1; and the first transfer apparatus is used for transferring the M batteries to M first pallets on the first transmission line according to the types of the M batteries.

Referring to FIG. 1, the first identification apparatus (not shown in the figure) and the first transfer apparatus may be provided on two sides of the material incoming mechanism 101, respectively. For example, if the first identification apparatus is provided at point O1, the first transfer apparatus may be provided at point O2. However, the first identification apparatus and the first transfer apparatus may also be provided on the same side. For example, they may be provided both at point O1 or both at point O2.

The material incoming mechanism 101 may receive M batteries at a time so that the first identification apparatus may identify the types of the M batteries received by the material incoming mechanism, thus enabling the first transfer apparatus to transfer the M batteries to M first pallets on the first transmission line according to the types of the M batteries. Each battery may bear a type identifier so that the first identification apparatus may identify the type of the battery based on the type identifier. As mentioned above, the type of a battery may be classified according to the dimensions such as the shape, grade, size of the battery.

In this embodiment, the correspondence between the types of batteries and the first transmission line 103 may be preset so that the order of transfer of the M batteries is determined according to the types of the M batteries and this correspondence, and then the first transfer apparatus sequentially transfers the M batteries to M first pallets on the first transmission line according to the order of transfer of the M batteries.

In some embodiments, the first identification apparatus may be a first camera module that can identify the types of the M batteries received by the material incoming mechanism by means of visual identification technology.

In some embodiments, the first identification apparatus may be a first sensing module in which a card reader may be provided, wherein this card reader can read the type identifiers of batteries, so that the types of the M batteries received by the material incoming mechanism are identified through the card reader.

It should be noted that the first camera module and the first sensing module described above are only examples for the first identification apparatus in this embodiment, and the specific implementation is not limited in this regard.

In this embodiment, when transferring the M batteries received by the material incoming mechanism, the first transfer apparatus transfers the M batteries to M first pallets on the first transmission line in combination with the types of the M batteries identified by the first identification apparatus, which is conducive to achieving targeted transfer according to different types of batteries so as to meet the actual production needs.

According to some embodiments of the present application, optionally, in the case where the M batteries are all of the same type or all of different types, the first transfer apparatus is used for transferring the M batteries to the M first pallets on the first transmission line; and in the case where the M batteries comprise batteries of different types and there are batteries of the same types, the first transfer apparatus is used for separately transferring the batteries of the same types sequentially to the M first pallets on the first transmission line, wherein batteries transferred by the first transfer apparatus each time are of the same type and two adjacent transfers are separated by a preset time interval.

For ease of understanding, the following is illustrated with M=4.

The 4 batteries are all of the same type or all of different types, that is, the 4 batteries are of the same type, or the 4 batteries are of 4 types, in which case the first transfer apparatus transfers the 4 batteries to 4 first pallets on the first transmission line at the same time.

There are several possible cases where the 4 batteries comprise batteries of different types and there are batteries of the same type: 1 battery of type 1 and 3 batteries of type 2, or 2 batteries of type 1 and 2 batteries of type 2. In the above case, the first transfer apparatus transfers the 4 batteries in several times, each time transferring one type of battery. For example, batteries of type 1 are first taken as a group to transfer the batteries of type 1, and after a preset time interval, batteries of type 2 are taken as a group to transfer the batteries of type 2. Here, the preset time interval may be set according to the actual needs, for example, it may be 2s, which is, however, not specifically limited in this embodiment.

In this embodiment, there is provided a way for the first transfer apparatus to transfer batteries in two different situations. Considering that all the M batteries are of the same type or all different, the order in which the M batteries are transferred by the first transfer apparatus has little impact on the production takt of the whole system, and therefore, in this case, the first transfer apparatus directly transfers the M batteries to M first pallets on the first transmission line. In the case where the M batteries comprise batteries of different types and there are batteries of the same type, the order in which the M batteries are transferred by the first transfer apparatus may have some impact on the production takt of the whole system, and therefore, in this case, the first transfer apparatus transfers batteries of the same type each time and sequentially grasps batteries of the same types to M first pallets on the first transmission line, which is beneficial to enable batteries of the same type to be unloaded at the same time when they reach the unloading position, that is, they are transferred to the first starting position of the second transmission line at the same time, thereby avoiding the situation where batteries are easily disordered when being unloaded from the first transmission line. Meanwhile, it is also beneficial to make the number of batteries on the second transmission line at the first starting position reach N quickly, thus speeding up the battery transmission.

According to some embodiments of the present application, optionally, the first transfer apparatus is used for transferring, according to the numbers of the batteries of the same types among the M batteries, the batteries of the same types sequentially to the M first pallets on the first transmission line.

For ease of understanding, the following is still illustrated with M=4: assuming that, among the 4 batteries, 3 are of type 1 and 1 of type 2, then the number of batteries of type 1 is more than the number of batteries of type 2. The first transfer apparatus may transfer the 3 batteries of type 1 and the 1 battery of type 2 to 4 first pallets on the first transmission line successively according to the number of batteries of type 1 and the number of batteries of type 2 among the 4 batteries. In this embodiment, depending on the numbers of batteries of the same types, the 3 batteries of type 1 that are in greater number may be transferred first, or the 1 battery of type 2 that is in smaller number may be transferred first.

In this embodiment, the order in which each type of battery is transferred is determined according to the numbers of batteries of the same types among the M batteries, and the number of batteries of each type may affect the different degree of congestion on the first transmission line caused when the batteries of that type are transferred on the first transmission line. Therefore, in combination with the numbers of batteries of the same types among the M batteries, batteries of the same types are sequentially grasped to M first pallets on the first transmission line, which is beneficial to avoid to a certain extent the state of congestion between multiple first pallets that may occur on the first transmission line.

According to some embodiments of the present application, optionally, the first transfer apparatus is used for transferring, according to the order of the numbers of the batteries of the same types among the M batteries from large to small, the batteries of the same types sequentially to the M first pallets on the first transmission line.

For ease of understanding, the following is still illustrated with M=4: assuming that, among the 4 batteries, 3 are of type 1 and 1 of type 2, then the number of batteries of type 1 is more than the number of batteries of type 2. The first transfer apparatus, depending on the numbers of batteries of the same types, may first transfer the 3 batteries of type 1 that are in greater number, and after a preset time interval, transfer the 1 battery of type 2 that is in smaller number. When among the 4 batteries, 2 are of type 1 and 2 of type 2, it is possible to randomly select which type of batteries to be transferred first.

In this embodiment, considering that the greater the number of batteries of the same type, the greater the possibility of causing congestion of batteries on the first transmission line, and therefore batteries of the same type that are in greater number are transferred first, so that batteries of the same type that are in greater number can be unloaded at the unloading position of the first transmission line as early as possible to alleviate the degree of congestion of the batteries transferred on the first transmission line to a greater extent and enable the first transmission line to transmit batteries in an orderly manner. Moreover, after batteries of the same types in high quantities are transferred, the first pallets carrying these batteries become empty pallets and can go to carry new batteries again so as to achieve cyclic transmission of batteries and speed up the transmission of batteries.

According to some embodiments of the present application, optionally, the first transmission line has a plurality of unloading positions for which a plurality of second transmission lines are provided correspondingly, each of the second transmission lines corresponding to a battery type; and the battery transmission system further comprises: a second identification apparatus, wherein the second identification apparatus is used for identifying the type of a battery transmitted to the unloading position; and the second transfer apparatus is used for transferring the battery transmitted to the unloading position to a first starting position of a second transmission line corresponding to the type of the battery.

Referring to FIG. 1, the first transmission line has a plurality of unloading positions, which are unloading positions 1031, 1032, 1033, 1034, and 1035, respectively, and these 5 unloading positions correspond to the second transmission lines 1 to 5, respectively. Each second transmission line may correspond to one type of battery, to indicate that different second transmission lines are used for transmitting different types of batteries, respectively.

In some embodiments, one second identification apparatus may be provided for each unloading position to separately identify the types of batteries transmitted to each unloading position. For example, the second identification apparatus may be provided at the same location as the second transfer apparatus. Alternatively, for each second transmission line, the second transfer apparatus and the second identification apparatus may be provided on the two sides of the first starting position of the second transmission line, respectively. The second transfer apparatus and the second identification apparatus can communicate with each other, so that the second transfer apparatus can learn the identification result of the second identification apparatus and thus perform subsequent battery transfer actions. The second identification apparatus is similar to the first identification apparatus, but the difference is that it is disposed at a different position, that is, the second identification apparatus may be a second camera module or a second sensing module.

In some embodiments, referring to FIG. 1, it is assumed that the second transfer apparatuses set for the unloading positions 1031 to 1035 are the second transfer apparatuses 1 to 5, respectively, and the second identification apparatuses provided for the unloading positions 1031 to 1035 are the second identification apparatuses 1 to 5, respectively. When the second identification apparatus 1 recognizes the presence of a battery of type 1 among batteries transmitted to the unloading position 1031, the second transfer apparatus 1 transfers the battery of type 1 to the first starting position of the second transmission line 1. When there are N batteries of type 1 accumulated at the first starting position of the second transmission line 1, the second transmission line 1 transmits these N batteries of type 1 as a group of batteries to the first termination position of the second transmission line 1. Similarly, when the second identification apparatus 2 recognizes the presence of a battery of type 2 among batteries transmitted to the unloading position 1032, the second transfer apparatus 2 transfers the battery of type 2 to the first starting position of the second transmission line 2. When there are N batteries of type 2 accumulated at the first starting position of the second transmission line 2, the second transmission line 2 transmits these N batteries of type 2 as a group of batteries to the first termination position of the second transmission line 2. By analogy, when the second identification apparatus 5 recognizes the presence of a battery of type 5 among batteries transmitted to the unloading position 1035, the second transfer apparatus 5 transfers the battery of type 5 to the first starting position of the second transmission line 5. When there are N batteries of type 5 accumulated at the first starting position of the second transmission line 5, the second transmission line 5 transmits these N batteries of type 5 as a group of batteries to the first termination position of the second transmission line 5.

In this embodiment, when a battery is conveyed to the unloading position, the second identification apparatus identifies the type of the battery transmitted to the unloading position, so that the second transfer apparatus transfers the battery transmitted to the unloading position to the first starting position of the second transmission line corresponding to the type of the battery. That is, by identifying the types of batteries transmitted to the unloading position by the second identification apparatus, batteries of different types enter second transmission lines corresponding to different types, which facilitates targeted transmission of batteries of different types.

According to some embodiments of the present application, optionally, the second transfer apparatus is used for transferring, according to the number a of batteries of a target type that are transmitted to the unloading position and the number b of batteries of the target type that are already present at the first starting position, c batteries transmitted to the unloading position to a first starting position of a second transmission line corresponding to the target type, wherein a≥c, and when a≥N−b, b+c=N.

Referring to FIG. 1, assuming that the target type is type 1, N=4, the number a of batteries of type 1 transmitted to the unloading position 1031 is 3, and the number b of batteries of type 1 already present at the first starting position of the second transmission line 1 corresponding to the unloading position 1031 is 2, that is, 2 more batteries of type 1 are needed to bring the number of batteries at the first starting position of the second transmission line 1 to 4. At this point, the second transfer apparatus 1 can directly transfer 2 of the 4 batteries of type 1 that are transmitted to the unloading position 1031 to the first starting position of the second transmission line 1, so that the number of batteries of type 1 at the first starting position reaches 4, and the second transmission line 1 can then transfer these 4 batteries from the first starting position to the first termination position. At this point, there are no batteries at the first starting position of the second transmission line 1, so that the second transfer apparatus 1 can transfer the remaining 1 battery of type 1 at the unloading position 1031 to the first starting position of the second transmission line 1. Then, the first pallet carrying the 3 batteries of type 1 becomes empty and the empty pallet continues to move along the first transmission line 103.

In this embodiment, according to the number a of batteries of the target type at the unloading position and the number b of batteries of the target type already present at the first starting position, c batteries are transferred directly to the first starting position, so that the number of batteries at the first starting position after the transfer can directly reach N, which avoid the situation where the second transfer apparatus needs to perform multiple transfers to make the number of batteries at the first starting position reach N, thus improving the transmission efficiency of batteries.

According to some embodiments of the present application, optionally, each of the first pallets is independently controlled by a controller, the controller being used for controlling a first pallet in which the batteries transmitted to the unloading position are located to stop movement when the second transfer apparatus transfers the batteries transmitted to the unloading position, and controlling the first pallet to start movement after determining that the batteries in the first pallet are transferred.

Referring to FIG. 1, the multiple first pallets 102 in FIG. 1 may each have a respective controller (not shown in FIG. 1) that may be provided in the first pallet 102 to control the movement or stopping of that first pallet 102 at a desired timing. For example, when the second transfer apparatus transfers batteries transmitted to the unloading position, the first pallet in which the batteries transmitted to the unloading position are located is controlled to stop movement, and the first pallet is controlled to start movement after it is determined that the batteries in the first pallet have been transferred.

In this embodiment, when the second transfer apparatus transfers batteries transmitted to the unloading position, the controller controls the first pallet where the batteries transmitted to the unloading position are located to stop movement, and when the first pallet stops movement, the batteries placed in this first pallet are in a relatively stationary and stable state. At this time, when the batteries are transferred by the second transfer device, it is beneficial to avoid collision of the batteries when they are transferred, thus contributing to the safety of battery transmission. After it is determined that the batteries in the first pallet have been transferred, the first pallet is controlled to start movement, so that the other first pallets on the first transmission line can also continue moving in turn.

According to some embodiments of the present application, optionally, the first transmission line has a loading position, the controller being further used for controlling the first pallet to stop movement when the first pallet is moved on the first transmission line to the loading position, and controlling the first pallet to start movement after the first transfer apparatus transfers batteries to the first pallet.

Referring to FIG. 1, the loading position of the first transmission line 103 may be: a position facing the material incoming mechanism 101. When the first pallet 102 moves on the first transmission line 103 to the loading position, the controller for this first pallet 102 may control the first pallet 102 to stop movement and, after the first transfer apparatus transfers batteries to the first pallet 102, control the first pallet 102 to start movement to cause the first pallet 102 to start movement on the first transmission line to convey batteries.

In this embodiment, this first pallet is in a relatively stationary and stable state when the first pallet stops movement, and in this case, when batteries are transferred by the first transfer apparatus, it is beneficial to avoid collision of the batteries when they are transferred, thus contributing to the safety of battery transmission.

According to some embodiments of the present application, optionally, the number of the first pallets on the first transmission line is multiple, each of the first pallets being used for conveying one battery, and adjacent ones of the first pallets being spaced at a preset safe distance during movement on the first transmission line.

Here, the preset safe distance may be set according to actual needs, and this embodiment does not make specific limitations on its specific magnitude. Each first pallet can convey a single battery, when the distance between two adjacent first pallets is equal to the safe distance, the later one of the two adjacent first pallets can be controlled by the controller to stop movement, so as to prevent the first pallet from continuing to move and collide with the first pallet in front of it, thereby avoiding collision of batteries in the two first pallets.

In this embodiment, adjacent first pallets are spaced at a preset safe distance during movement on the first transmission line, thus facilitating avoiding collisions between the first pallets which result in collisions of batteries in the first pallets, that is, improving the safety of simultaneous movement of several first pallets on the first transmission line.

According to some embodiments of the present application, optionally, the second transmission line comprises m connected belts, each belt moving independently under the drive by a motor, the first starting position being the position of the 1st belt and the first termination position being the position of the mth belt, m>1, wherein when N batteries are transmitted to the mth belt, a motor for the mth belt is used for controlling the mth belt to stop movement; when N batteries are transmitted to the mth belt and there are N batteries present on each of k1 consecutive belts located after the mth belt, motors for the k1 consecutive belts after the mth belt are used for controlling the k1 consecutive belts to stop movement, respectively, $k1 \geq 1$; when N batteries are transmitted to the ith belt and there are no batteries on the (i+1)th belt, a motor for the ith belt is used for controlling the ith belt to move, $i \geq 1$; and when N batteries are transmitted to the ith belt and there are N batteries present on each of k2 consecutive belts located before the ith belt and none of the k2 consecutive belts is the mth belt, the motor for the ith belt is used for controlling the ith belt to move and motors for the k2 consecutive belts are used for controlling the k2 consecutive belts to move, respectively, $k2 \geq 1$.

Figure 2:
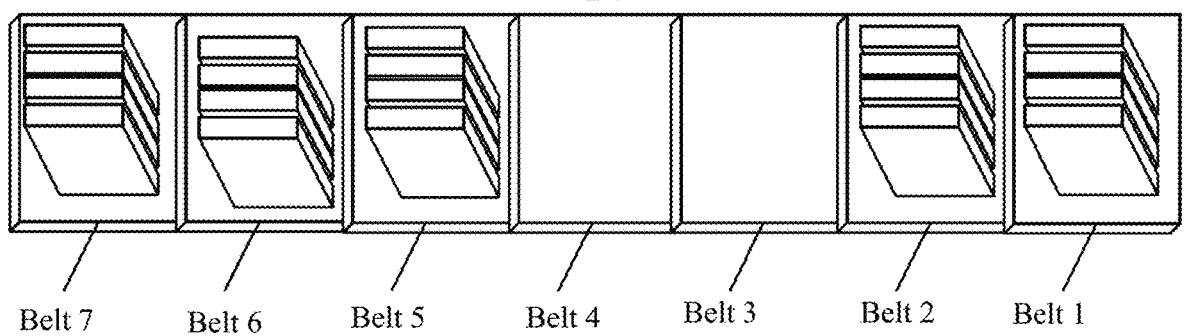
FIG. 2 is a schematic diagram of a second transmission line as disclosed in some embodiments of the present application.

For ease of understanding, the following is illustrated taking the second transmission line in FIG. 2 as an example:

As can be seen in FIG. 2, m=7 and N=4, and the second transmission line comprises 7 connected belts, each of which can move independently under the drive by one motor (not shown in FIG. 2). The first starting position is the position where belt 1 is located, and the first termination position is the position where belt 7 is located.

When 4 batteries are transmitted to the 7th belt, the motor for the 7th belt is used for controlling the 7th belt to stop movement;

when 4 batteries are transmitted to the 7th belt and there are already 4 batteries present on each of 3 consecutive belts (belts 4, 5, 6) located after the 7th belt, the motors for the 3 consecutive belts after the 7th belt are used for controlling the belts 4, 5, 6 to stop movement, respectively;

when 4 batteries are transmitted to the 2nd belt (belt 2) and there are no batteries on the 3rd belt (belt 3), the motor for belt 2 is used for controlling the movement of belt 2; and when 4 batteries are transmitted to the 1st belt (belt 1) and there are 4 batteries present on 1 consecutive belt (belt 2) located before belt 2 and belt 2 is not the 7th belt, the motor for belt 1 is used for controlling the movement of belt 1 while the motor for belt 2 is used for controlling the movement of belt 2.

In this embodiment, the second transmission line comprises m connected belts, each belt being independently controlled by a motor, thereby avoiding collisions of batteries on the second transmission line during transmission and improving the safety of battery transmission.

According to some embodiments of the present application, optionally, the battery transmission system further comprises: an assembly apparatus for assembly based on batteries that are at the first termination position to obtain a battery pack.

Here, the assembly apparatus may be a packing machine that may perform assembly based on batteries that are at the first termination position to obtain battery packs of different specifications, wherein the difference in the battery packs of different specifications is reflected in the difference in the number of battery layers, the difference in the number of battery rows in each layer, and the difference in the number of batteries in each row.

Figure 3:
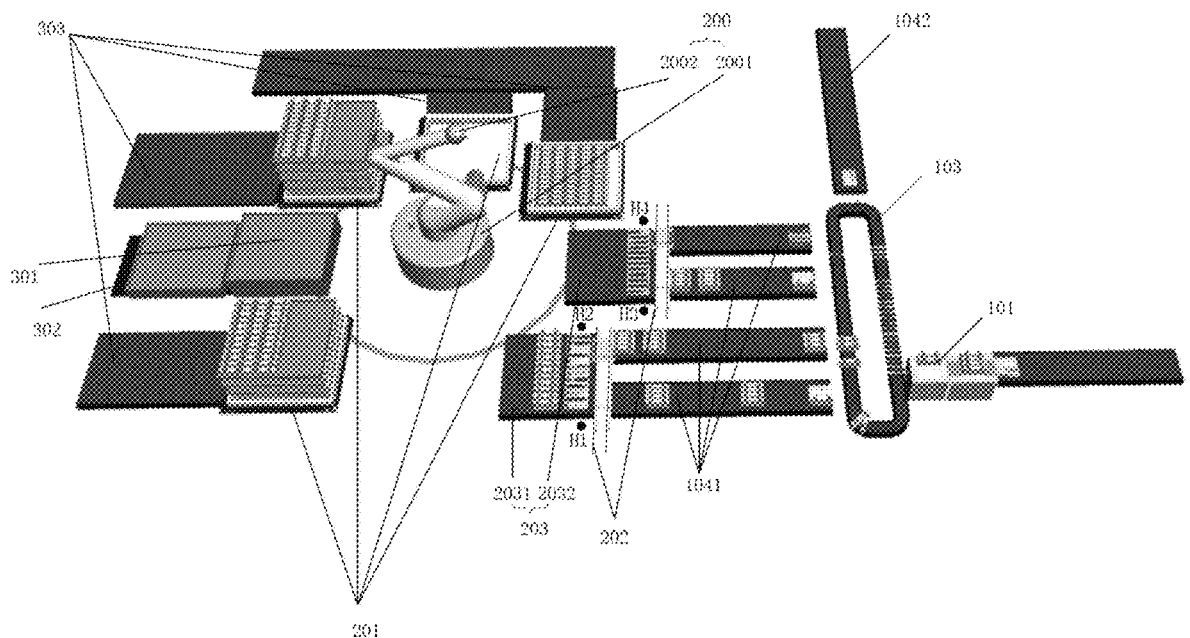
FIG. 3 is a schematic diagram of another battery transmission system as disclosed in some embodiments of the present application.

In some embodiments, reference can be made to FIG. 3 for the schematic diagram of the battery transmission system, wherein the assembly apparatus 200 comprises a base 2001 and a rotatable packing machine grasper 2002 provided on the base 2001. The packing machine grasper 2002 can grasp batteries from the first termination position and pack them to obtain a battery pack.

In this embodiment, the combination of the assembly apparatus facilitates automatic assembly of battery packs, which avoids the need for manual intervention for the assembly of battery packs, thus facilitating the improvement of the assembly efficiency of battery packs.

According to some embodiments of the present application, optionally, the battery transmission system further comprises: a third transmission line corresponding to the second transmission line, the assembly apparatus is used for transferring the batteries at the first termination position to a middle cover of the third transmission line and, after a layer of batteries is arranged all over the middle cover, transferring a new middle cover onto the layer of batteries; and if the number of battery layers does not reach a preset number of layers, the assembly apparatus is used for continuing to transfer batteries to the new middle cover until the number of battery layers reaches the preset number of layers to obtain an assembled battery pack.

Referring to FIG. 3, the battery transmission system further comprises: third transmission lines 201 corresponding to second transmission lines 1041, wherein there are 4 second transmission lines 1041 and also 4 third transmission lines 201 corresponding to them. The 4 second transmission lines 1041 are separately used for transmitting different types of batteries, and the 4 third transmission lines 201 are used for stacking different types of batteries to obtain different types of battery packs. In other words, different third transmission lines correspond to different types, and different types of battery packs can be assembled on third transmission lines corresponding to different types. The position of the third transmission line can be understood as the palletizing position of the batteries.

The packing machine grasper 2002 in the assembly apparatus 200 is used for transferring batteries at the first termination positions to a middle cover on the third transmission lines 201. Specifically, the packing machine grasper 2002 may transfer a battery at the first termination position to a middle cover on a third transmission line 201 corresponding to the type of the battery, depending on the type of the battery. For example, the packing machine grasper 2002 may transfer a battery of type 1 at the first termination position to a middle cover on a third transmission line 201 corresponding to type 1. After arranging a layer of batteries of type 1 all over the middle cover, the packing machine grasper 2002 transfers a new middle cover onto the layer of batteries. If the number of battery layers does not reach a preset number of layers, the packing machine grasper 2002 continues to transfer batteries of type 1 to new middle covers until the number of battery layers reaches the preset number of layers to obtain an assembled battery pack of type 1. The preset number of layers can be set according to actual needs, which is not specifically limited in this embodiment, and the preset numbers of layers corresponding to different types can be the same or different. Similarly, since there are 4 third transmission lines 201 in FIG. 3, it is possible to perform packing to obtain battery packs of types 2, 3 and 4 in the same way as performing packing to obtain the battery pack of type 1.

In this embodiment, the different settings of the preset number of layers facilitate the automatic assembly to obtain battery packs having different numbers of battery layers, so as to achieve automatic assembly of battery packs of different specifications, thus making it possible to reduce the cost of battery assembly and improve the efficiency of battery assembly.

According to some embodiments of the present application, optionally, the battery transmission system further comprises: a sliding module for transferring the batteries at the first termination position to a second starting position of a fourth transmission line to form a row of batteries at the second starting position, the row of batteries comprising a plurality of batteries of the same type; the fourth transmission line for transmitting the row of batteries to a second termination position of the fourth transmission line after the row of batteries is formed at the second starting position; and the assembly apparatus for transferring the row of batteries at the second termination position to a middle cover of a third transmission line corresponding to the type of the row of batteries.

Referring to FIG. 3, the battery transmission system further comprises: a sliding module 202 and a fourth transmission line 203. The sliding module 202 is used for transferring batteries at the first termination position to a second starting position of the fourth transmission line 203 to form a row of batteries at the second starting position, the row of batteries comprising a plurality of batteries of the same type; and the second starting position of the fourth transmission line 203 being a position on the fourth transmission line 203 that is close to the sliding module 202. The number of batteries included in the row of batteries can be set according to the actually required battery pack specifications. After forming a row of batteries at the second starting position, the fourth transmission line 203 transfers the row of batteries toward the second termination position of the fourth transmission line 203. The packing machine grasper 2002 is used for grasping the row of batteries at the second termination position to a middle cover of a third transmission line 201 corresponding to the type of the row of batteries.

For example, in the case of transferring batteries of type 1, the sliding module 202 transfers the batteries of type 1 at the first termination position to the second starting position of the fourth transmission line 203 to form a row of batteries of type 1 at the second starting position. After forming the row of batteries of type 1 at the second starting position, the fourth transmission line 203 transfers the row of batteries toward the second termination position of the fourth transmission line 203. The packer grasper 2002 is used for grasping the row of batteries of type 1 at the second termination position to the middle cover of the third transmission line 201 corresponding to type 1. The way of transmitting other types of batteries is similar to the way of transmitting batteries of type 1 as described above, and is not repeated here to avoid repetition.

In this embodiment, by providing the sliding module and the fourth transmission line, it is possible for the assembly apparatus to transfer one row of batteries formed on the second starting position at a time, which facilitates the reduction of the number of round trips of grasping and placing by the assembly apparatus while keeping the time for round trips of transfers by the assembly apparatus unchanged, thus improving the takt of the production line to increase the yield of battery packs.

According to some embodiments of the present application, optionally, if the number of battery layers does not reach the preset number of layers, the assembly apparatus is further used for continuing transferring the row of batteries at the second termination position and placing same on the new middle cover until the number of battery layers reaches the preset number of layers to obtain the assembled battery pack, the layer of batteries comprising a number of rows of batteries of the same type.

For example, taking the assembly of a battery pack of type 1 as an example, if the number of battery layers of type 1 currently stacked on the third transmission line 201 does not reach the preset number of layers, the packing machine grasper 2002 continues to grasp the row of batteries of type 1 at the second termination position and place them on a new middle cover until the number of battery layers reaches the preset number of layers to obtain an assembled battery pack of type 1. Here, the layer of batteries comprises several rows of batteries of the same type, and each row of batteries comprise several batteries of the same type. Other types of battery packs are assembled in a similar manner as described above and will not be repeated here.

In this embodiment, when the number of battery layers does not reach the preset number of layers, the assembly apparatus is used to continue transferring rows of batteries to the middle cover, which facilitates automatic assembly to obtain a battery pack that can reach the preset number of layers.

According to some embodiments of the present application, optionally, the sliding module comprises: a sliding track and a sliding pallet slidable on the sliding track, the sliding pallet being used for receiving the N batteries transmitted by the second transmission line and carrying the N batteries to slide along the sliding track to a row-forming position; and the sliding track being used for sliding in the direction of the fourth transmission line when the sliding pallet slides to the row-forming position, so that the N batteries on the sliding pallet slide to the second starting position, wherein when there are batteries present at the second starting position, the N batteries received by the sliding pallet are of the same type as the batteries present at the second starting position, and the N batteries on the sliding pallet, after sliding to the second starting position, belong to the same row of batteries as the batteries present at the second starting position.

Figure 4:
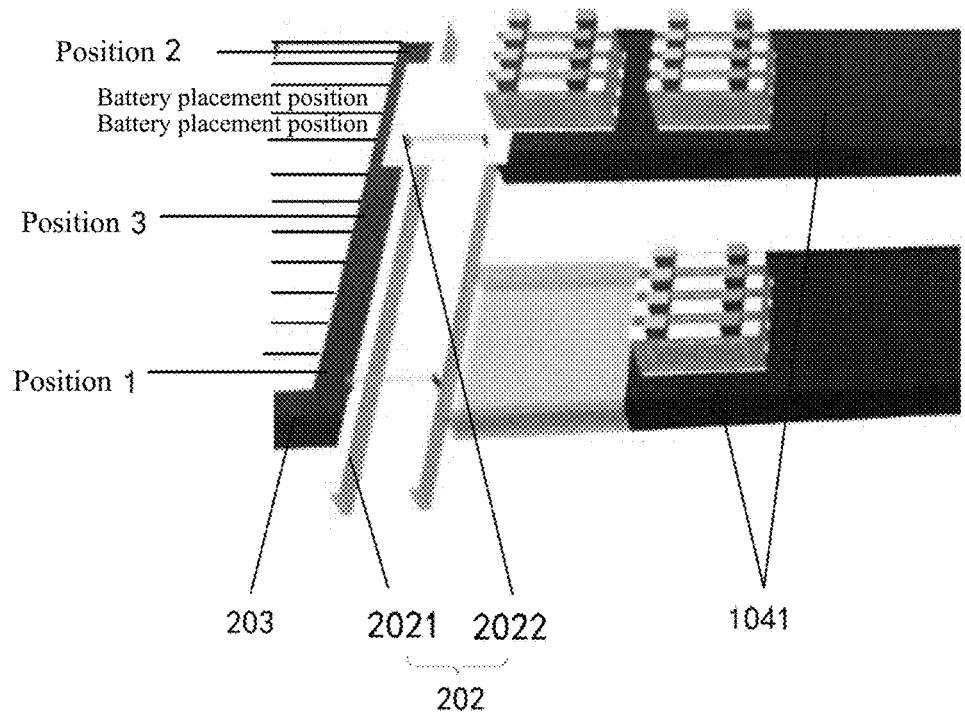
FIG. 4 is a schematic diagram of a convex sliding module in a battery transmission system as disclosed in some embodiments of the present application.

Referring to FIG. 4. FIG. 4 is a schematic diagram of a convex sliding module in the battery transmission system. The sliding module 202 comprises a sliding track 2021 and a sliding pallet 2022 slidable on the sliding track 2021. The sliding pallet 2022 is used for receiving 4 batteries transmitted at one time on the second transmission line 1041 and carrying the 4 batteries to slide along the sliding track to a row-forming position. As can be seen from FIG. 4, there are no batteries present at the second starting position, and the row-forming position can be either position 1 or position 2 in FIG. 4. Any position between position 1 and position 2 can be understood as the second starting position. In a specific implementation, if there are batteries present at battery placement positions of the second starting position, for example, if there are batteries present at all battery placement positions between position 1 and position 3, the row-forming position may be position 3, so as to enable the sliding track 2021 to slide in the direction of the fourth transmission line 203 as the sliding pallet 2022 slides to position 3, so that the 4 batteries on the sliding pallet 2021 slide to a battery placement position corresponding to position 3, thereby forming the same row of batteries as the batteries present between position 1 and position 3.

In this embodiment, the cooperation of the sliding track and the sliding pallet facilitates the smooth conveying of the N batteries transmitted on the second transmission line to the second starting position of the fourth transmission line in order to form a row of batteries of the same type at the second starting position. The sliding pallet can slide on the sliding track so that the sliding pallet can accept batteries transmitted by more than one second transmission line, facilitating the transfer of batteries transmitted by second transmission lines corresponding to different types to the fourth transmission line, so as to wait for the assembly apparatus to perform further transfer of a row of batteries at the second termination position of the fourth transmission line.

According to some embodiments of the present application, optionally, the type comprises: a qualified type and an unqualified type, and the second transmission line comprising a qualified-type transmission line and an unqualified-type transmission line, the sliding module being used for transferring the N batteries transmitted to a first termination position of the qualified-type transmission line to the second starting position; and the unqualified-type transmission line being used for transmitting batteries transmitted to a first initial position of the unqualified-type transmission line to a first termination position of the unqualified-type transmission line.

Referring to FIG. 3, the second transmission line 104 comprise a qualified-type transmission line 1041 and an unqualified-type transmission line 1042. The sliding module 202 transfers 4 batteries transmitted to the first termination position of the qualified-type transmission line 1041 to the second starting position; and the unqualified-type transmission line 1042 transmits batteries transmitted to the first initial position of the unqualified-type transmission line 1042 to the first termination position of the unqualified-type transmission line.

In some embodiments, the qualified type may be a qualified grade and the unqualified type may be an unqualified grade. That is, in this embodiment, batteries of the qualified grade can be assembled to obtain a qualified battery pack, while batteries of the unqualified grade can be screened out by transmitting them to the first termination position of the unqualified-grade transmission line.

In this embodiment, by providing qualified-type transmission lines and unqualified-type transmission lines, it is convenient for the assembly apparatus to assemble qualified batteries coming from the qualified-type transmission lines, and by transmitting unqualified-type batteries through the unqualified-type transmission lines, it is beneficial to automatically screen out unqualified batteries through specific transmission lines to ensure the product quality of battery packs finally obtained through assembly.

According to some embodiments of the present application, optionally, the battery transmission system further comprises: a spacing-changing mechanism, the spacing-changing mechanism being used for adjusting the spacing between batteries in the row of batteries formed at the second starting position so that the row of batteries for which the spacing has been adjusted conforms to an assembly range of the assembly apparatus.

Referring to FIG. 3, the spacing-changing mechanism (not shown in FIG. 3) may be provided on either side of the second starting position of the fourth transmission line 203. In FIG. 3, the fourth transmission line 203 comprises a fourth transmission line 2031 and a fourth transmission line 2032, and a corresponding spacing-changing mechanism may be provided for each of the two fourth transmission lines. For example, for the fourth transmission line 2031, the spacing-changing mechanism may be provided at point H1 or point H2 on either side of the second starting position of the fourth transmission line 2031. For the fourth transmission line 2032, the spacing-changing mechanism may be provided at point H3 or point H4 on either side of the second starting position of the fourth transmission line 2032. The spacing-changing mechanism provided at point H1 or H2 is used for adjusting the spacing between batteries in the row of batteries formed on the second starting position of the fourth transmission line 2031. The spacing-changing mechanism provided at point H3 or H4 is used for adjusting the spacing between batteries in the row of batteries formed on the second starting position of the fourth transmission line 2032.

In some embodiments, the assembly range of the assembly apparatus may be the grasping range of the packing machine grasper 2002 so that the packing machine grasper 2002 can grasp the row of batteries formed on the second starting position at one time.

In this embodiment, the spacing-changing mechanism is provided to facilitate smooth transfer, by the assembly apparatus, the row of batteries on the second starting position within its own assembly range.

According to some embodiments of the present application, optionally, the battery transmission system further comprises: a lifting apparatus on which a second pallet is placed, the second pallet being used for placing a stack of middle covers, the lifting apparatus being used for lifting the second pallet to a preset height after each transfer of a new middle cover by the assembly apparatus.

Here, the lifting apparatus may be a lifter. Referring to FIG. 3, the lifting apparatus (not shown in FIG. 3) may be provided at the location where a stack of middle covers 301 are located, and the stack of middle covers 301 may be placed on the second pallet (not shown in FIG. 3). The stack of middle covers 301 may comprise a plurality of stacked middle covers. The lifting apparatus lifts the second pallet to a preset height after the packing machine grasper 2002 grasps a new middle cover each time. Here, the preset height may be set according to actual needs, for example, it may be the height of one middle cover.

In this embodiment, the lifter raises the second pallet to the preset height after each transfer of a new middle cover by the assembly apparatus, enabling the assembly apparatus to transfer a middle cover based on the same height each time, thereby saving production takts.

According to some embodiments of the present application, optionally, the lifting apparatus is further used for lowering the second pallet to an initial height after the stack of middle covers placed on the second pallet have all been transferred by the assembly apparatus.

In some embodiments, the stack of middle covers placed on the second pallet having all been transferred by the assembly apparatus can be understood as follows: the stack of middle covers placed on the second pallet are grasped away by the packing machine grasper, making the second pallet an empty pallet, at which time the lifting apparatus can lower the second pallet to the initial height to facilitate the placement of a stack of middle covers again on the second pallet that has been lowered to the initial height.

In this embodiment, the lifting apparatus lowers the second pallet to the initial height after the stack of middle covers placed on the second pallet have all been transferred by the assembly apparatus, thus facilitating subsequent placement of a stack of middle covers again on the second pallet.

According to some embodiments of the present application, optionally, the battery transmission system further comprises: a fifth transmission line, the fifth transmission line being used for re-transmitting a stack of middle covers to the second pallet after the second pallet has been lowered to the initial height.

Referring to FIG. 3, the fifth transmission line 302 in the battery transmission system retransmits a stack of middle covers to the second pallet after the second pallet has been lowered to the initial height.

In this embodiment, by re-transmitting a stack of middle covers to the second pallet that has been lowered to the initial height, the automatic process of battery assembly can be carried out continuously and automatically.

According to some embodiments of the present application, optionally, the battery transmission system further comprises: a sixth transmission line, the sixth transmission line being used for transmitting the battery pack to a target area to enable an AGV in the target area to transport the battery pack to a warehouse.

Referring to FIG. 3, the sixth transmission line 303 in the battery transmission system, the sixth transmission line 303 comprises 4 transmission lines for transmitting 4 types of battery packs, respectively, wherein these 4 sixth transmission lines 303 are used for transmitting 4 types of battery packs obtained on the 4 third transmission lines 202 to the target area, respectively, so as to cause an automated guided vehicle (AGV) in the target area to transport the battery packs to the warehouse. Here, the target area may be set according to actual needs, which is not specifically limited in this embodiment.

In some embodiments, if the type of battery is grade, the 4 sixth transmission lines 303 are used for transmitting 4 grades of battery packs obtained on the 4 third transmission lines 202 to the target area, respectively, so as to cause the AGV in the target area to transport the battery packs to the warehouse.

In this embodiment, battery packs are automatically transmitted to the target area via the sixth transmission lines, which facilitates the transportation of palletized battery cells to the warehouse by the AGV in the target area to meet the storage needs of the assembled battery packs, further improving the whole process of automatic production of battery packs.

Figure 5:
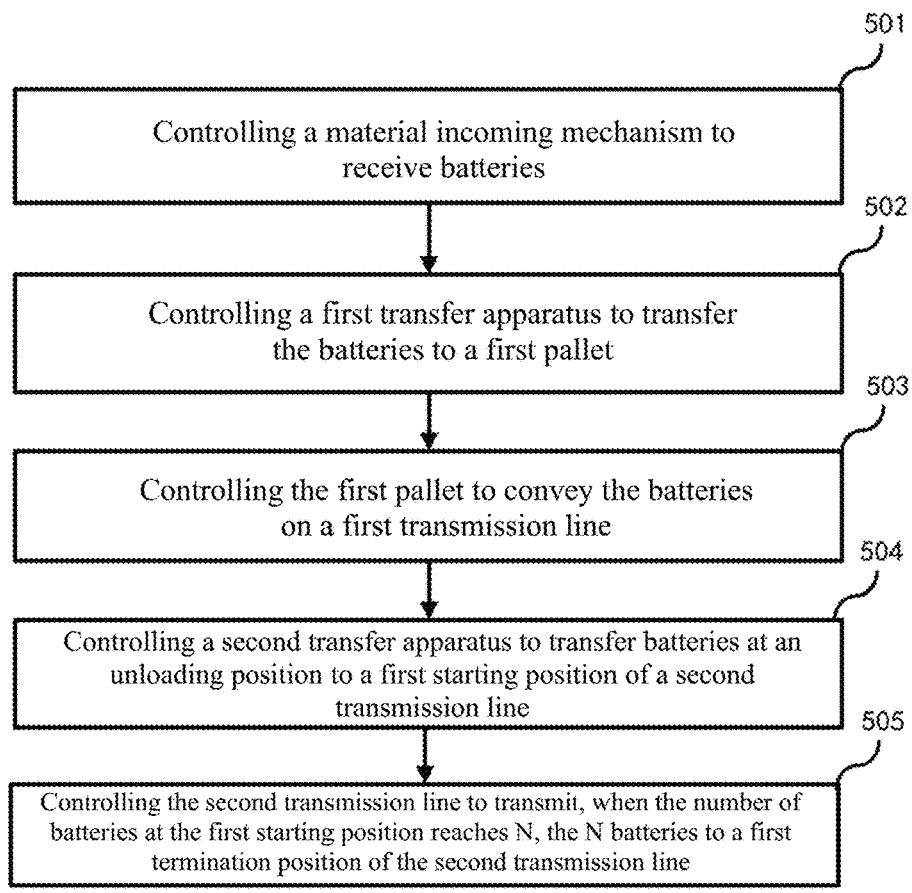
FIG. 5 is a flowchart of a control method as disclosed in some embodiments of the present application.

According to some embodiments of the present application, reference can be made to FIG. 3 for the battery transmission system which comprises: a material incoming mechanism 101, a first transfer apparatus (not shown in the figure), a first pallet 102, a first transmission line 103, a second transmission line 104, a second transfer apparatus (not shown in the figure), a first identification apparatus (not shown in the figure), a second identification apparatus (not shown in the figure), a base 2001, a packing machine grasper 2002, a third transmission line 201, a sliding module 202, a fourth transmission line 203, a spacing-changing mechanism (not shown in the figure), a lifting apparatus (not shown in the figure), a stack of middle covers 301, a fifth transmission line 302, and a sixth transmission line 303. Among them, the third transmission line 201 (which can be understood as the battery cell palletizing position corresponding to different grades), the fourth transmission line 203, and the stack of middle covers 301 (which can be understood as the middle cover placement position) are arranged on a circumference with the packing machine 200 as the circular center and R as the radius. Here, R may be determined according to the range in which the packing machine can be stretched, so as to make it convenient for the packing machine grasper 2002 to grasp a row of battery cells from the fourth transmission line 203 and place them on a middle cover on the corresponding third transmission line 201, and also make it convenient for the packing machine grasper 2002 to grasp a middle cover from the stack of middle covers 301; moreover, such settings are also conducive to saving site space at the site, thus being able to save a certain amount of site costs According to some embodiments of the present application, a control method is provided for controlling the battery transmission system as described in any of the above embodiments, wherein the control method applies to a programmable logic controller (PLC), and the components of the battery transmission system can interact through the PLC if they need to communicate with each other. The flow chart of the control method can be referred to FIG. 5, which comprises:

Step 501: controlling a material incoming mechanism to receive batteries.

Step 502: controlling a first transfer apparatus to transfer the batteries to a first pallet.

Step 503: controlling the first pallet to convey the batteries on a first transmission line, wherein the first transmission line has an unloading position for which at least one second transmission line is provided correspondingly.

Step 504: controlling a second transfer apparatus to transfer batteries at the unloading position to a first starting position of the second transmission line.

Step 505: controlling the second transmission line to transmit, when the number of batteries at the first starting position reaches N, the N batteries to a first termination position of the second transmission line, wherein N≥1.

The steps of the above various methods are divided only for the purpose of descriptive clarity, and the steps may be combined into one step or some of the steps may be split into a plurality of steps during implementation. As long as a same logical relationship is included, all cases are within the protection scope of this patent. Adding insignificant modifications or introducing insignificant designs to an algorithm or flow without changing core designs of the patent's algorithm and flow is within its protection scope.

It is not difficult to find that this embodiment is an embodiment of the control method corresponding to the embodiment of the battery transmission system described above, and this embodiment can be implemented with the embodiment of the battery transmission system described above in conjunction with each other. The relevant technical details and technical effects mentioned in the above embodiments of the battery transmission system are still valid in this embodiment, and will not be repeated here in order to reduce repetition. Accordingly, the relevant technical details mentioned in this embodiment can also apply to the above embodiments of the battery transmission system.

Figure 6:
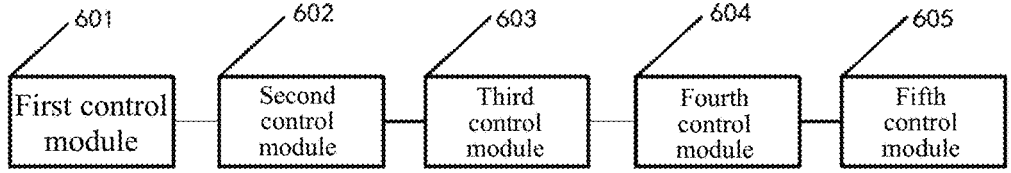
FIG. 6 is a schematic diagram of a control apparatus as disclosed in some embodiments of the present application.

According to some embodiments of the present application, a control apparatus is provided for controlling the battery transmission system as described in any of the above embodiments, reference can be made to FIG. 6 for the schematic diagram of the control apparatus, which comprises: a first control module 601 for controlling a material incoming mechanism to receive batteries; a second control module 602 for controlling a first transfer apparatus to transfer the batteries to a first pallet; a third control module 603 for controlling the first pallet to convey the batteries on a first transmission line, wherein the first transmission line has an unloading position for which at least one second transmission line is provided correspondingly; a fourth control module 604 for controlling a second transfer apparatus to transfer batteries at the unloading position to a first starting position of the second transmission line; and a fifth control module 605 for controlling the second transmission line to transmit, when the number of batteries at the first starting position reaches N, the N batteries to a first termination position of the second transmission line, wherein N≥1.

It is not difficult to find that this embodiment is an embodiment of the control apparatus corresponding to the embodiment of the battery transmission system described above, and this embodiment can be implemented with the embodiment of the battery transmission system described above in conjunction with each other. The relevant technical details and technical effects mentioned in the above embodiments of the battery transmission system are still valid in this embodiment, and will not be repeated here in order to reduce repetition. Accordingly, the relevant technical details mentioned in this embodiment can also apply to the above embodiments of the battery transmission system.

Figure 7:
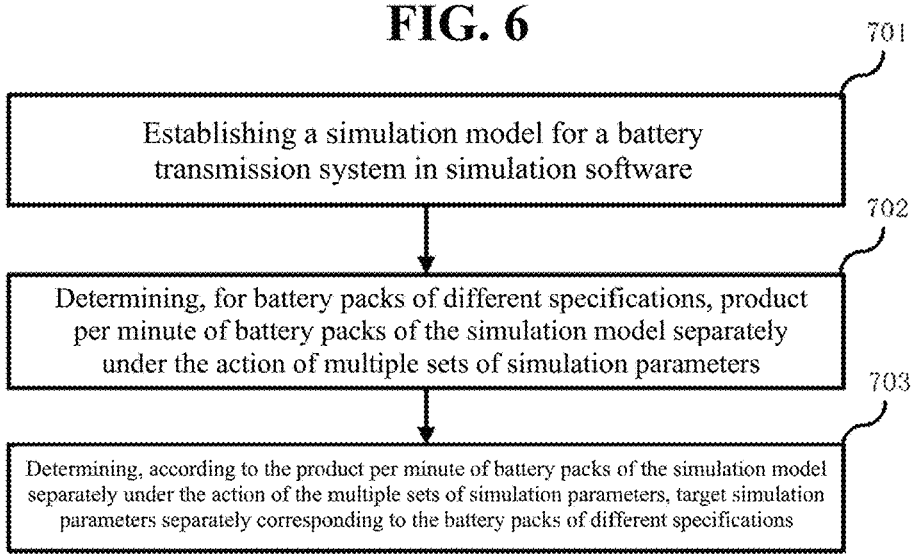
FIG. 7 is a flowchart of a simulation method for a battery transmission system as disclosed in some embodiments of the present application.

According to some embodiments of the present application, a simulation method for a battery transmission system is provided, wherein the battery transmission system is the battery transmission system in the above embodiments, and reference can be made to FIG. 7 for the flow chart of the simulation method, which comprises:

Step 701: establishing a simulation model for the battery transmission system in simulation software.

Step 702: determining, for battery packs of different specifications, product per minute of battery packs of the simulation model separately under the action of multiple sets of simulation parameters.

Step 703: determining, according to the product per minute of battery packs of the simulation model separately under the action of the multiple sets of simulation parameters, target simulation parameters separately corresponding to the battery packs of different specifications.

In step 701, the simulation model may be a 3D model of the battery transmission system.

In step 702, simulation parameters can be input in a parameter setting interface in the simulation software for battery packs of different specifications, so as to start running the simulation model based on the input simulation parameters to obtain the product per minute (PPM) of battery packs corresponding to the simulation model under the action of the input simulation parameters. By inputting different simulation parameters to perform multiple simulations, corresponding PPM can be obtained under the action of different simulation parameters.

According to some embodiments of the present application, optionally, the simulation parameters comprise: the number of battery rows in a layer of batteries and the number of batteries transferred by an assembly apparatus each time. Considering that the factors that have a significant impact on the unit yield of battery packs comprise: the number of battery rows in a layer of batteries and the number of batteries transferred by an assembly apparatus each time. Therefore, the simulation parameters comprise: the number of battery rows in a layer of batteries and the number of batteries transferred by an assembly apparatus each time, which are conducive to obtaining assembly parameters that are desired in actual production.

Figure 8:
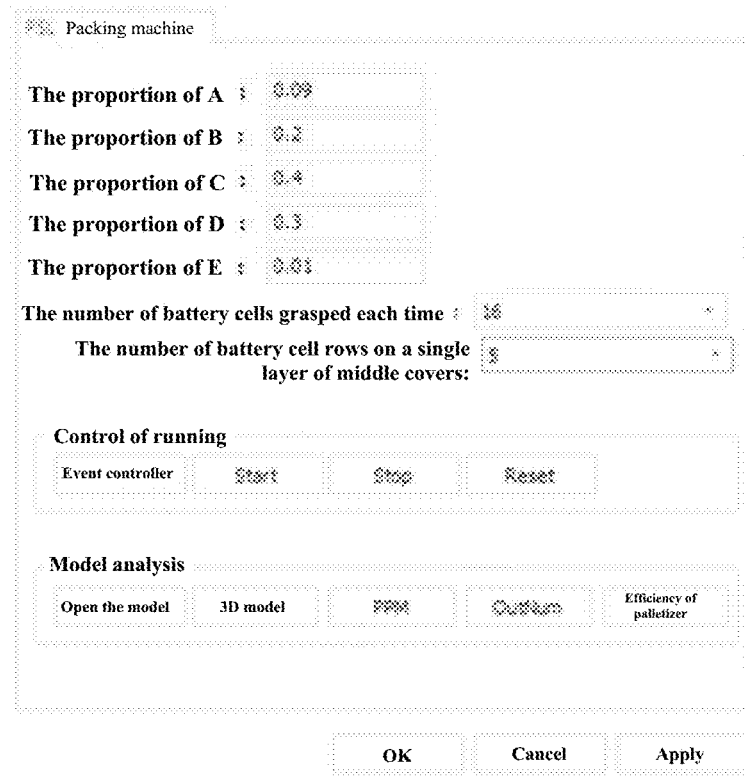
FIG. 8 is a schematic diagram of a parameter setting interface as disclosed in some embodiments of the present application.

In some embodiments, the battery transmission system may be a battery cell transmission system and the assembly apparatus is a packing machine. The number of battery rows in a layer of batteries and the number of batteries transferred by the assembly apparatus each time may be the number of battery cell rows in a layer of battery cells and the number of battery cells grasped by the packing machine grasper each time, respectively. Reference can made be to FIG. 8 for the schematic diagram of the parameter setting interface, where A, B, C, D, and E may indicate types of battery cells, and A, B, C, and D indicate qualified grades and E indicates unqualified grade. The proportions of A, B, C, D, and E separately indicate the proportions of batteries of different grades in each battery cell received by the material incoming mechanism during one simulation. In FIG. 8, the number of battery cells grasped each time may be the number of battery cells grasped each time by the packing machine grasper in the simulation parameters, and the number of battery cell rows on a single layer of middle covers may be the number of battery cell rows in one layer of battery cells in the simulation parameters. The proportions of A, B, C, D and E, the number of battery cells grasped each time, and the number of battery cell rows on a single layer of middle covers can be modified by the parameter setting interface in FIG. 8, and an OK button can be clicked after each determination of the simulation parameters to start this simulation and to determine the PPM obtained under the action of the parameters of this simulation after this simulation is finished.

Figure 9:
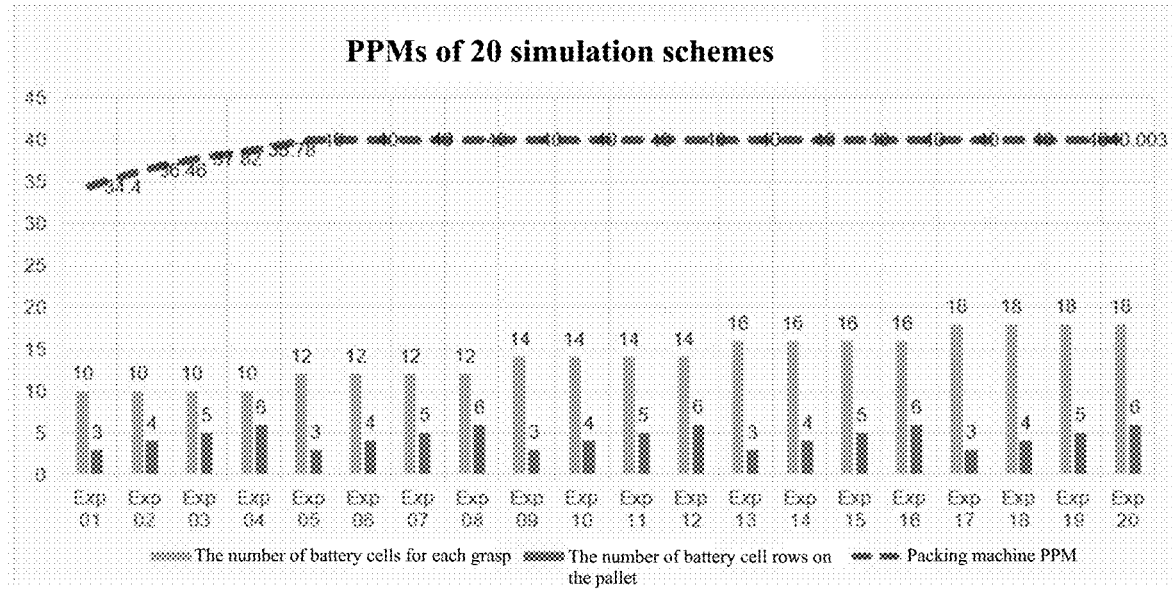
FIG. 9 is a schematic diagram of PPMs obtained after simulation using 20 simulation schemes, as disclosed in some embodiments of the present application.
Figure 10:
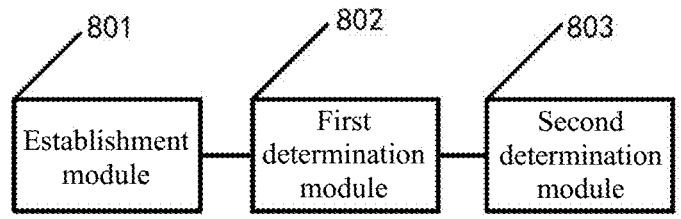
FIG. 10 is a schematic diagram of a simulation apparatus for a battery transmission system, as disclosed in some embodiments of the present application.

Referring to FIG. 9. FIG. 9 is the schematic diagram of PPM obtained after simulation using 20 simulation parameters (i.e., in 20 simulation scenarios). In FIG. 9, the number of battery cells for each grasp is the number of battery cells grasped by the packing machine grasper each time in the simulation parameters, and the number of battery cell rows on the pallet is the number of battery cell rows in one layer of batteries in the simulation parameters.

In step 703, referring to FIG. 9, target simulation parameters separately corresponding to the battery packs of different specifications can be determined according to the PPM of the simulation model separately under the action of the 20 sets of simulation parameters, wherein the product per minute of battery packs under the action of the target simulation parameters is greater than a preset quantity, the target simulation parameters separately corresponding to the battery packs of different specifications being used as assembly parameters of the battery transmission system when assembling the battery packs of different specifications. For example, the simulation parameter with PPM greater than or equal to 40 can be selected as the target simulation parameter to ensure that the yield of battery packs can meet the expectation when the target simulation parameter is used in the real battery transmission system. As can be seen from FIG. 9, when the number of battery cells grasped each time is 10, which fails to satisfy the requirement of PPM being greater than or equal to 40, then the number of battery cells grasped each time by the packing machine grasper in the target simulation parameters will not take 10, but 12, 14, 16 or 18 which are greater than 10.

In this embodiment, the simulation of the battery cell transmission system facilitates the quick selection of assembly parameters for battery packs of different specifications that can lead to a higher yield of battery packs so as to be applied to the actual production line construction and production, thereby facilitating the automated transmission and assembly while increasing the unit yield of battery packs of different specifications. In this embodiment, in order to improve the yield while achieving the replacement of manual packing by a packing machine, the use of a simulation method to verify and optimize the design scheme in advance is conducive to eliminating the design risk, realizing the grasping and placing of multi-specification and single-specification multi-grade battery cells, and proposing the improvement schemes in a targeted manner, which also facilitates device transformation and upgrading at a later stage.

According to some embodiments of the present application, a simulation apparatus for a battery transmission system is provided, wherein the battery transmission system is the battery transmission system as described in any one of the above embodiments. Reference is made to FIG. for the schematic diagram of the simulation apparatus, which comprises: an establishment module 801 for establishing a simulation model for the battery transmission system in simulation software; a first determination module 802 for determining, for battery packs of different specifications, product per minute of battery packs of the simulation model separately under the action of multiple sets of simulation parameters; a second determination module 803 for determining, according to the product per minute of battery packs of the simulation model separately under the action of the multiple sets of simulation parameters, target simulation parameters separately corresponding to the battery packs of different specifications, wherein the product per minute of battery packs under the action of the target simulation parameters is greater than a preset quantity, the target simulation parameters separately corresponding to the battery packs of different specifications being used as assembly parameters of the battery transmission system when assembling the battery packs of different specifications.

It is not difficult to find that this embodiment is an embodiment of the control apparatus corresponding to the embodiment of the simulation method for a battery transmission system described above, and this embodiment can be implemented with the embodiment of the simulation method for a battery transmission system described above in conjunction with each other. The relevant technical details and technical effects mentioned in the above embodiments of the simulation method for a battery transmission system are still valid in this embodiment, and will not be repeated here in order to reduce repetition. Accordingly, the relevant technical details mentioned in this embodiment can also apply to the above embodiments of the simulation method for a battery transmission system.

Figure 11:
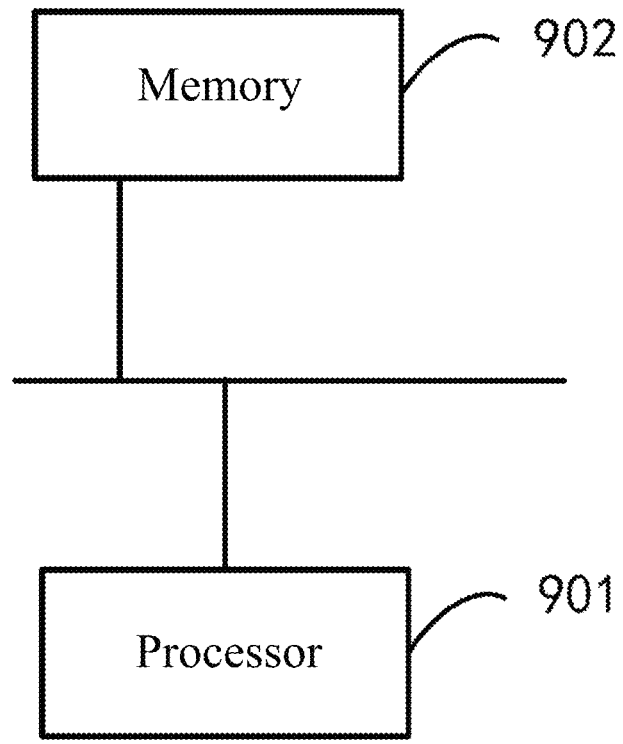
FIG. 11 is a schematic structural view of a PLC as disclosed in some embodiments of the present application.

According to some embodiments of the present application, a PLC is provided which, with reference to FIG. 11, comprises:

at least one processor 901; and a memory 902 communicatively connected to the at least one processor 901, wherein the memory 902 stores instructions executable by the at least one processor 901, the instructions being executed by the at least one processor 901 to enable the at least one processor 901 to execute the control method for a battery transmission system described above.

Here, the memory 902 and the processor 901 are connected by means of a bus, wherein the bus may comprise any number of interconnected buses and bridges, the bus connecting various circuits of the one or more processors 901 and the memory 902 together. The bus may also connect together various other circuits, such as peripherals, voltage regulators, and power management circuits, all of which are well known in the art and therefore will not be described further herein. A bus interface provides an interface between the bus and a transceiver. The transceiver may be a single element or multiple elements, such as multiple receivers and transmitters, providing a unit for communicating with various other apparatuses over a transmission medium. Data processed via the processor 901 is transmitted on a wireless medium over an antenna, and further, the antenna also receives the data and conveys the data to the processor 901.

The processor 901 is responsible for bus managing and general processing, and may also provide various functions comprising timing, peripheral interface, voltage regulation, power management, and other control functions. In addition, the memory 902 may be used for storing data that is used by the processor 901 in performing operations.

Figure 12:
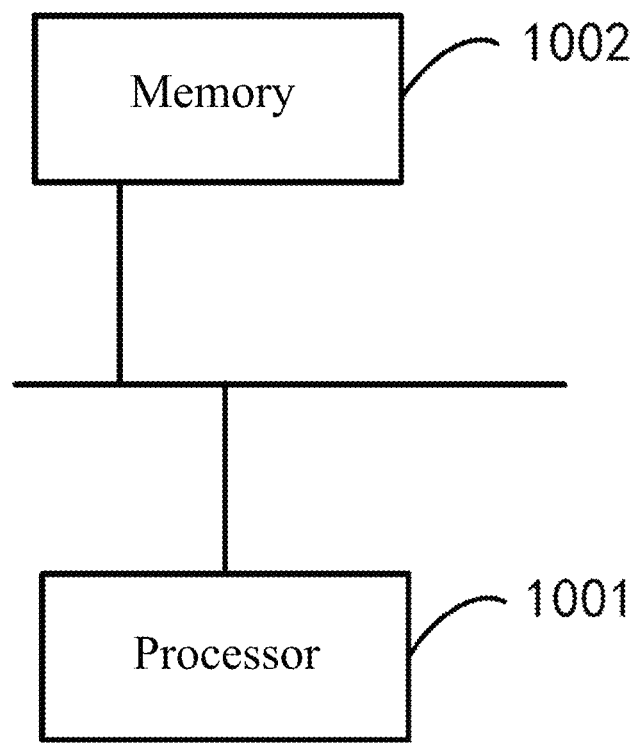
FIG. 12 is a schematic structural view of an electronic device as disclosed in some embodiments of the present application.

According to some embodiments of the present application, an electronic device is provided which, with reference to FIG. 12, comprises: at least one processor 1001; and a memory 1002 communicatively connected to the at least one processor 1001, wherein the memory 1002 stores instructions executable by the at least one processor 1001, the instructions being executed by the at least one processor 1001 to enable the at least one processor 1001 to execute the simulation method for a battery transmission system described above.

Here, the memory 1002 and the processor 1001 are connected by means of a bus, wherein the bus may comprise any number of interconnected buses and bridges, the bus connecting various circuits of the one or more processors 1001 and the memory 1002 together. The bus may also connect together various other circuits, such as peripherals, voltage regulators, and power management circuits, all of which are well known in the art and therefore will not be described further herein. A bus interface provides an interface between the bus and a transceiver. The transceiver may be a single element or multiple elements, such as multiple receivers and transmitters, providing a unit for communicating with various other apparatuses over a transmission medium. Data processed via the processor 1001 is transmitted on a wireless medium over an antenna, and further, the antenna also receives the data and conveys the data to the processor 1001.

The processor 1001 is responsible for bus managing and general processing, and may also provide various functions comprising timing, peripheral interface, voltage regulation, power management, and other control functions. In addition, the memory 1002 may be used for storing data that is used by the processor 1001 in performing operations.

According to some embodiments of the present application, a computer-readable storage medium is provided which stores a computer program. The computer program implements the above-mentioned method examples when executed by the processor.

That is, those skilled in the art could understand that implementing all or part of the steps in the above-mentioned example methods may be achieved by a program instructing relevant hardware, and the program is stored in one storage medium and comprises several instructions to enable one device (which may be a single chip microcomputer, a chip, etc.) or a processor to execute all or part of the steps of the methods described in the various examples of the present application. The aforementioned storage medium comprises: a USB flash drive, a portable hard disk, a Read-Only Memory (ROM), a Random Access Memory (RAM), a magnetic disk or optical disk and other media that can store program codes.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather comprises all technical solutions falling within the scope of the claims.

The invention claimed is:

1. A battery transmission system, comprising:
a material incoming structure to receive batteries;
a first transfer structure to transfer the batteries to a first pallet so as to convey the batteries on a first transmission line, wherein the first transmission line has an unloading position for which at least one second transmission line is provided correspondingly; and
a second transfer structure to transfer batteries at the unloading position to a first starting position of the second transmission line so as to transmit, when the number of batteries at the first starting position reaches N, the N batteries to a first termination position of the second transmission line, wherein N>1.

2. The battery transmission system according to claim 1, wherein the battery transmission system further comprises:
a first identifier to identify types of M batteries received by the material incoming structure, wherein M>1; and
the first transfer structure transfers the M batteries to M first pallets on the first transmission line according to the types of the M batteries.

3. The battery transmission system according to claim 2, wherein
in the case where the M batteries are all of the same type or all of different types, the first transfer structure transfers the M batteries to the M first pallets on the first transmission line; and
in the case where the M batteries comprise batteries of different types and there are batteries of the same types, the first transfer structure separately transfers the batteries of the same types sequentially to the M first pallets on the first transmission line, wherein batteries transferred by the first transfer structure each time are of the same type and two adjacent transfers are separated by a preset time interval.

4. The battery transmission system according to claim 3, wherein the first transfer structure transfers, according to the numbers of the batteries of the same types among the M batteries, the batteries of the same types sequentially to the M first pallets on the first transmission line.

5. The battery transmission system according to claim 4, wherein the first transfer structure transfers, according to the order of the numbers of the batteries of the same types among the M batteries from large to small, the batteries of the same types sequentially to the M first pallets on the first transmission line.

6. The battery transmission system according to claim 1, wherein the first transmission line has a plurality of unloading positions for which a plurality of second transmission lines are provided correspondingly, each of the second transmission lines corresponding to a battery type; and the battery transmission system further comprises: a second identifier, wherein the second identifier identifies the type of a battery transmitted to the unloading position; and the second transfer structure transfers the battery transmitted to the unloading position to a first starting position of a second transmission line corresponding to the type of the battery.

7. The battery transmission system according to claim 6, wherein the second transfer structure transfers, according to the number a of batteries of a target type that are transmitted to the unloading position and the number b of batteries of the target type that are already present at the first starting position, c batteries transmitted to the unloading position to a first starting position of a second transmission line corresponding to the target type, wherein a≥c, and when a≥N−b, b+c=N.

8. The battery transmission system according to claim 6, wherein each of the first pallets is independently controlled by a controller, and the controller is configured to control a first pallet in which the batteries transmitted to the unloading position are located to stop movement when the second transfer structure transfers the batteries transmitted to the unloading position, and control the first pallet to start movement after determining that the batteries in the first pallet are transferred.

9. The battery transmission system according to claim 8, wherein the first transmission line has a loading position, and the controller is further configured to control the first pallet to stop movement when the first pallet is moved on the first transmission line to the loading position, and control the first pallet to start movement after the first transfer structure transfers batteries to the first pallet.

10. The battery transmission system according to claim 1, wherein the number of the first pallets on the first transmission line is multiple, each of the first pallets conveys one battery, and adjacent ones of the first pallets are spaced at a preset safe distance during movement on the first transmission line.

11. The battery transmission system according to claim 1, wherein the second transmission line comprises m connected belts, each belt moving independently under the drive by a motor, the first starting position being the position of the 1st belt and the first termination position being the position of the mth belt, m>1, wherein when N batteries are transmitted to the mth belt, a motor for the mth belt controls the mth belt to stop movement;

when N batteries are transmitted to the mth belt and there are N batteries present on each of k1 consecutive belts located after the mth belt, motors for the k1 consecutive belts after the mth belt control the k1 consecutive belts to stop movement, respectively, k1≥1;

when N batteries are transmitted to the ith belt and there are no batteries on the (i+1)th belt, a motor for the ith belt controls the ith belt to move, i≥1; and when N batteries are transmitted to the ith belt and there are N batteries present on each of k2 consecutive belts located before the ith belt and none of the k2 consecutive belts is the mth belt, the motor for the ith belt controls the ith belt to move and motors for the k2 consecutive belts control the k2 consecutive belts to move, respectively, k2≥1.

12. The battery transmission system according to claim 1, wherein the battery transmission system further comprises:

an assembly structure to assemble based on batteries that are at the first termination position to obtain a battery pack.

13. The battery transmission system according to claim 12, wherein the battery transmission system further comprises: a third transmission line corresponding to the second transmission line, and the assembly structure transfers the batteries at the first termination position to a middle cover of the third transmission line and, after a layer of batteries is arranged all over the middle cover, transfers a new middle cover onto the layer of batteries; and if the number of battery layers does not reach a preset number of layers, the assembly structure continues to transfer batteries to the new middle cover until the number of battery layers reaches the preset number of layers to obtain an assembled battery pack.

14. The battery transmission system according to claim 13, wherein the battery transmission system further comprises:

a sliding structure to transfer the batteries at the first termination position to a second starting position of a fourth transmission line to form a row of batteries at the second starting position, the row of batteries comprising a plurality of batteries of the same type;

the fourth transmission line to transmit the row of batteries to a second termination position of the fourth transmission line after the row of batteries is formed at the second starting position; and the assembly structure to transfer the row of batteries at the second termination position to a middle cover of a third transmission line corresponding to the type of the row of batteries.

15. The battery transmission system according to claim 14, wherein, if the number of battery layers does not reach the preset number of layers, the assembly structure further continues transferring the row of batteries at the second termination position and placing same on the new middle cover until the number of battery layers reaches the preset number of layers to obtain the assembled battery pack, the layer of batteries comprising a number of rows of batteries of the same type.

16. The battery transmission system according to claim 14, wherein the sliding structure comprises: a sliding track and a sliding pallet slidable on the sliding track, the sliding pallet receives the N batteries transmitted on the second transmission line and carries the N batteries to slide along the sliding track to a row-forming position; and the sliding track slides in the direction of the fourth transmission line when the sliding pallet slides to the row-forming position, so that the N batteries on the sliding pallet slide to the second starting position, wherein when there are batteries present at the second starting position, the N batteries received by the sliding pallet are of the same type as the batteries present at the second starting position, and the N batteries on the sliding pallet, after sliding to the second starting position, belong to the same row of batteries as the batteries present at the second starting position.

17. The battery transmission system according to claim 14, wherein the type comprises: a qualified type and an unqualified type, and the second transmission line comprises a qualified-type transmission line and an unqualified-type transmission line, the sliding structure transfers the N batteries transmitted to a first termination position of the qualified-type transmission line to the second starting position; and the unqualified-type transmission line being used to transmit batteries transmitted to a first initial position of the unqualified-type transmission line to a first termination position of the unqualified-type transmission line.

18. The battery transmission system according to claim 14, wherein the battery transmission system further comprises: a spacing-changing structure, the spacing-changing structure adjusts the spacing between batteries in the row of batteries formed at the second starting position so that the row of batteries for which the spacing has been adjusted conforms to an assembly range of the assembly apparatus.

19. The battery transmission system according to claim 13, wherein the battery transmission system further comprises: a lifting structure on which a second pallet is placed, the second pallet being used to place a stack of middle covers, and the lifting structure lifts the second pallet to a preset height after each transfer of a new middle cover by the assembly structure.

20. The battery transmission system according to claim 19, wherein the lifting structure further lowers the second pallet to an initial height after the stack of middle covers placed on the second pallet have all been transferred by the assembly structure.

21. The battery transmission system according to claim 20, wherein the battery transmission system further comprises: a fifth transmission line to re-transmit a stack of middle covers to the second pallet after the second pallet has been lowered to the initial height.

22. The battery transmission system according to claim 12, wherein the battery transmission system further comprises: a sixth transmission line to transmit the battery pack to a target area to enable an AGV in the target area to transport the battery pack to a warehouse.

23. A control method for controlling a battery transmission system, wherein the control method applies to a PLC, the control method comprising:

controlling a material incoming structure to receive batteries;

controlling a first transfer structure to transfer the batteries to a first pallet;

controlling the first pallet to convey the batteries on a first transmission line, wherein the first transmission line has an unloading position for which at least one second transmission line is provided correspondingly;

controlling a second transfer structure to transfer batteries at the unloading position to a first starting position of the second transmission line; and controlling the second transmission line to transmit, when the number of batteries at the first starting position reaches N, the N batteries to a first termination position of the second transmission line, wherein N≥1.

24. A control apparatus for controlling the battery transmission system, comprising circuitry to perform the control method of claim 23.

25. A simulation method for a battery transmission system, the simulation method comprising:

establishing a simulation model for the battery transmission system in simulation software;

determining, for battery packs of different specifications, product per minute of battery packs of the simulation model separately under the action of multiple sets of simulation parameters;

determining, according to the product per minute of battery packs of the simulation model separately under the action of the multiple sets of simulation parameters, target simulation parameters separately corresponding to the battery packs of different specifications, wherein the product per minute of battery packs under the action of the target simulation parameters is greater than a preset quantity, the target simulation parameters separately corresponding to the battery packs of different specifications being used as assembly parameters of the battery transmission system when assembling the battery packs of different specifications.

26. The simulation method according to claim 25, wherein the simulation parameters comprise: the number of battery rows in a layer of batteries and the number of batteries transferred by an assembly apparatus each time.

27. A simulation apparatus for a battery transmission system, comprising circuitry to perform the simulation method of claim 25.

28. A programmable logic controller (PLC), comprising:

at least one processor; and a memory communicatively connected to the at least one processor, wherein the memory stores instructions executable by the at least one processor, the instructions being executed by the at least one processor to enable the at least one processor to execute the control method according to claim 23.

29. An electronic device, comprising:

at least one processor; and a memory communicatively connected to the at least one processor, wherein the memory stores instructions executable by the at least one processor, the instructions being executed by the at least one processor to enable the at least one processor to execute the simulation method according to claim 25.

30. A non-transitory computer-readable storage medium storing a computer program, wherein the computer program, when executed by a processor, implements the control method according to claim 23.

* * * * *